United States Patent
Fujishiro et al.

(10) Patent No.: US 7,529,432 B2
(45) Date of Patent: May 5, 2009

(54) DATA PROCESSING APPARATUS, DATA PROCESSING METHOD, PROGRAM, AND RECORDING MEDIUM

(75) Inventors: Shigeo Fujishiro, Tokyo (JP); Ikuo Someya, Tokyo (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 10/970,292

(22) Filed: Oct. 21, 2004

(65) Prior Publication Data

US 2005/0144540 A1 Jun. 30, 2005

(30) Foreign Application Priority Data

Oct. 22, 2003 (JP) ............................. 2003-361505

(51) Int. Cl.
G06K 9/32 (2006.01)
G06K 11/00 (2006.01)
H04N 1/46 (2006.01)

(52) U.S. Cl. .......................... 382/300; 714/48; 358/525

(58) Field of Classification Search .................. 382/276, 382/275, 299–300, 312; 714/48; 711/165; 703/21; 381/307; 358/525; 345/608–611
See application file for complete search history.

(56) References Cited

U.S. PATENT DOCUMENTS

| | | | |
|---|---|---|---|
| 4,253,145 A * | 2/1981 | Goldberg ..................... 703/21 |
| 5,335,296 A | 8/1994 | Larkin et al. | |
| 6,018,597 A | 1/2000 | Maltsev et al. | |
| 6,360,029 B1 | 3/2002 | Moller | |
| 6,917,698 B2 * | 7/2005 | Obi .............................. 382/151 |
| 7,143,256 B2 * | 11/2006 | Maciel ........................ 711/165 |
| 2003/0076972 A1 * | 4/2003 | Maejima ..................... 381/307 |

FOREIGN PATENT DOCUMENTS

| | | |
|---|---|---|
| EP | 0 367 418 | 5/1990 |
| EP | 0 814 600 | 12/1997 |

\* cited by examiner

*Primary Examiner*—Kanji Patel
(74) *Attorney, Agent, or Firm*—Frommer Lawrence & Haug LLP; William S. Frommer; Thomas F. Presson

(57) ABSTRACT

A data processing apparatus for converting discrete original image data into interpolated image data having a different number of sampling data from the original image data, including generating means for generating a plurality of the interpolated image data from the original image data, first virtualizing means for generating first virtual data including a virtual succession of the original image data, second virtualizing means for generating second virtual data including a virtual succession of each of the plural interpolated image data, error calculating means for calculating error between each of the second virtual data with respect to the plural interpolated image data and the first virtual data, and selecting means for selecting either one of the plural interpolated image data based on the error.

9 Claims, 19 Drawing Sheets

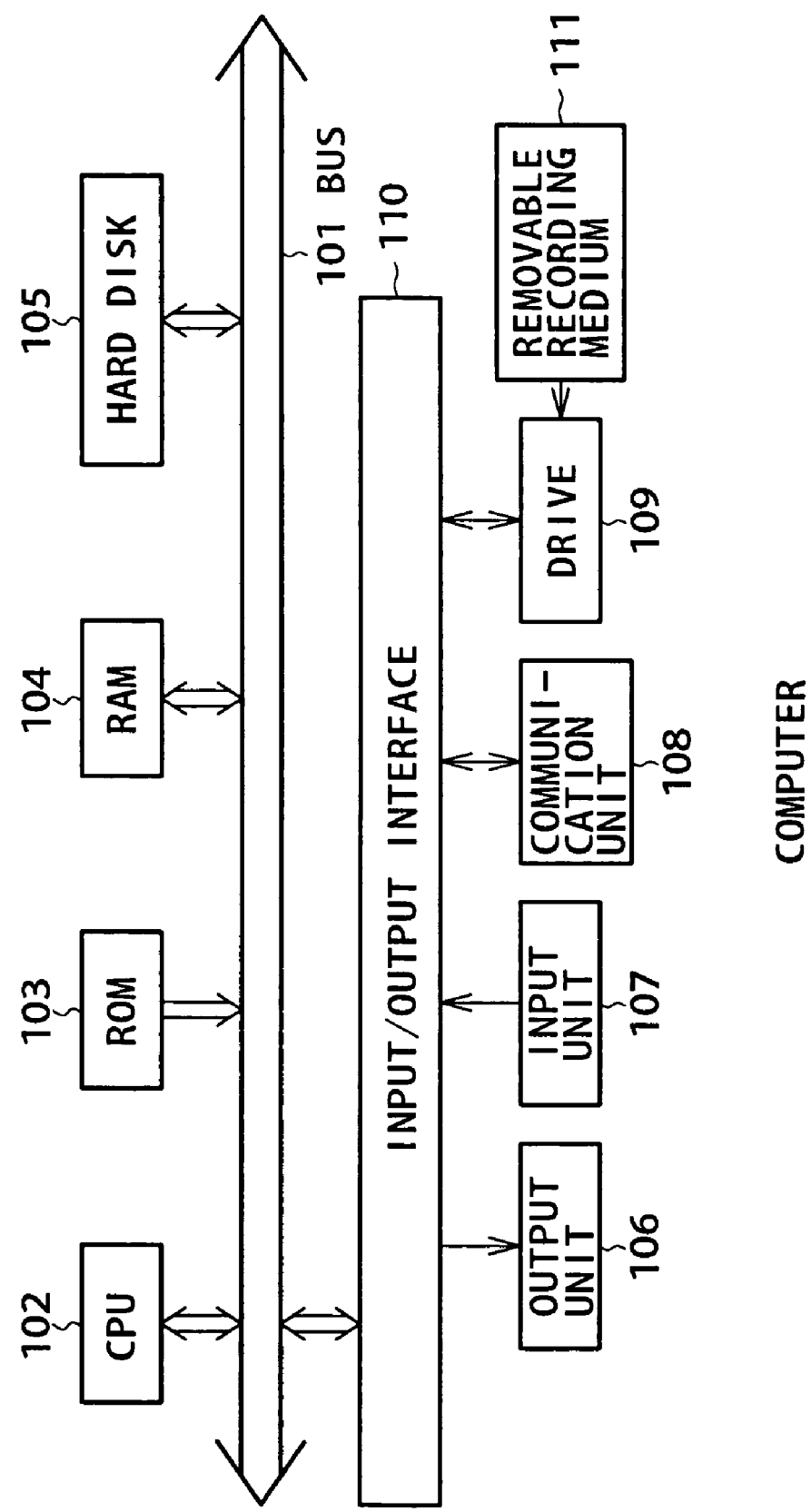

DATA PROCESSING APPARATUS, DATA PROCESSING METHOD, PROGRAM, AND RECORDING MEDIUM

BACKGROUND OF THE INVENTION

The present invention relates to a data processing apparatus, a data processing method, a program, and a recording medium, and more particularly to a data processing apparatus, a data processing method, a program, and a recording medium for easily producing optimum interpolated data of an image, for example.

DESCRIPTION OF THE RELATED ART

For enlarging and reducing an image, for example, the resolution of the image is converted. When the resolution of the image is converted, since the number of sampling points having pixel values of the image, i.e., the number of pixels, is changed, it is necessary to interpolate or decimate pixels in a manner to reflect the change.

A change in the number of pixels may be an increase from the original number of pixels or a reduction from the original number of pixels. Generally, increasing the original number of pixels is referred to as interpolation and reducing the original number of pixels as decimation. For the sake of illustrative convenience, however, both increasing the original number of pixels and reducing the original number of pixels will hereinafter be referred to as interpolation.

An image can be enlarged by an interpolation to increase the number of pixels and can be reduced by an interpolation (decimation) to reduce the number of pixels.

Known interpolation processes include nearest interpolation, straight interpolation (linear interpolation), cubic interpolation, etc.

Each of the above interpolation processes has strong and weak points. For example, if a computer graphic image or an image plotted on a computer, or an image free of frequency band limitations such as a text image on OSD (On Screen Display) is subjected to linear interpolation or cubic interpolation, the sharpness of edges is lost, resulting in a blurred text or the like.

On the other hand, if an area of a natural image where the luminance changes smoothly is subjected to nearest interpolation, then an image having stepwise jaggies is produced.

Japanese patent No. 3111971, for example, discloses a process of determining in advance or preparing attribute information of an image (natural image, character, or business graph) representing whether the image is a natural image or an unnatural image per pixel, and performing nearest interpolation on a text or the like and cubic information on a natural image based on the attribute information.

However, it is not always true that it is optimum to perform nearest interpolation on text.

Moreover, besides the selection of interpolation processes, the interpolation processes pose a problem with respect to the phase of sampling points. Such a problem will be described below in connection with the nearest interpolation.

FIG. 1 of the accompanying drawings shows the manner in which the number of sampling points (the number of pixels) in a certain direction of an original image is interpolated to 3/2 to generate an interpolated image.

In FIG. 1, the vertical axis represents sampling points (pixels) arrayed in a horizontal direction, a vertical direction, or any of other directions, and the vertical axis represents pixel values. For the sake of brevity, pixel values of an area to be interpolated of the original image are 0 or 1. This also holds true for examples shown in FIGS. 2, 3, and 10 through 14.

In FIG. 1, the upper figure shows the original image, and the lower figure shows the interpolated image where the number of sampling points of the original image is interpolated to 3/2.

As shown in FIG. 1, the pixel values at the sampling points #0, #1, #2, . . . of the original image are "1". When the original image shown in the upper figure in FIG. 1 is subjected to nearest interpolation, for example, the interpolated image shown in the lower figure in FIG. 1 is produced.

Specifically, the phase of the first sampling point #0 of the interpolated image is brought into conformity with the phase of the first sampling point #0 of the original image, setting subsequent sampling points of the interpolated image. In FIG. 1, since the number of sampling points (pixels) of the original image is interpolated to 3/2, the sampling points of the interpolated image are established (determined) such that the interval between sampling points (the interval between adjacent sampling points) of the interpolated image is equal to the interval between sampling points of the original image. According to the nearest interpolation, the pixel value of each sampling point of the interpolated image is set to the pixel value of the sampling point of the original image which is nearest to that each sampling point of the interpolated image.

As described above, the phase of the first sampling point #0 of the interpolated image is brought into conformity with the phase of the first sampling point #0 of the original image, i.e., the phase of the first sampling point #0 of the interpolated image is set to 0 in alignment with the phase of the first sampling point #0 of the original image, thereby setting subsequent sampling points of the interpolated image.

Therefore, if the pixel values of original images are arrayed in the same manner, but are held out of phase with each other, then interpolated images having different arrays of pixel values are produced from those original images.

Specifically, FIG. 2 of the accompanying drawings shows the manner in which the number of sampling points of an original image is interpolated to 3/2 to generate an interpolated image according to the nearest interpolation, as with FIG. 1.

In FIG. 2, the upper figure shows the original image, and the lower figure shows the interpolated image where the number of sampling points of the original image is interpolated to 3/2. In FIG. 2, the pixel values of the original image are arrayed as "1", "0", "1", "0", . . . . Specifically, the original image has the pixel value "1" at the sampling point #0, the pixel value "0" at the sampling point #1, the pixel value "1" at the sampling point #2, and subsequently an alternate pattern of pixel values "0" and "1".

As described above, the phase of the first sampling point #0 of the interpolated image is set to 0 in alignment with the phase of the first sampling point #0 of the original image, thereby setting subsequent sampling points of the interpolated image. According to the nearest interpolation, the pixel value of each sampling point of the interpolated image is set to the pixel value of the sampling point of the original image which is nearest to that each sampling point of the interpolated image.

In FIG. 2, therefore, the pixel value at the first sampling point #0 of the interpolated image is set to the pixel value "1" at the first sampling point #0 of the original image which is nearest thereto. The pixel values at the sampling points #1 and #2 of the interpolated image are set to the pixel value "0" at the sampling point #1 of the original image which is nearest thereto. The pixel value at the sampling point #3 of the interpolated image is set to the pixel value "1" at the sampling point #2 of the original image which is nearest thereto. Similarly, the pixel values of the interpolated image are subsequently set to "1", "0", "0", "1", "0", "0", "1", .... Thus, in FIG. 2, the interpolated image has a repetitive pattern of the pixel values "1", "0", "0".

FIG. 3 of the accompanying drawings shows the manner in which the number of sampling points of an original image is interpolated to 3/2 to generate an interpolated image according to the nearest interpolation, as with FIG. 1.

In FIG. 3, the upper figure shows the original image, and the lower figure shows the interpolated image where the number of sampling points of the original image is interpolated to 3/2. In FIG. 3, the pixel values of the original image are arrayed as "0", "1", "0", "1", .... Specifically, the original image has the pixel value "0" at the sampling point #0, the pixel value "1" at the sampling point #1, the pixel value "0" at the sampling point #2, and subsequently an alternate pattern of pixel values "0" and "1".

Each of the original images shown in FIGS. 2 and 3 has an alternate pattern of pixel values "0" and "1". However, whereas the original image shown in FIG. 2 has the pixel value "1" at the sampling point #0, the original image shown in FIG. 3 has the pixel value "0" at the sampling point #0. Therefore, the sampling points of the original images shown in FIGS. 2 and 3 are out of phase with each other by one sampling interval.

As described above, the phase of the first sampling point #0 of the interpolated image is set to 0 in alignment with the phase of the first sampling point #0 of the original image, thereby setting subsequent sampling points of the interpolated image. According to the nearest interpolation, the pixel value of each sampling point of the interpolated image is set to the pixel value of the sampling point of the original image which is nearest to that each sampling point of the interpolated image.

In FIG. 3, therefore, the pixel value at the first sampling point #0 of the interpolated image is set to the pixel value "0" at the first sampling point #0 of the original image which is nearest thereto. The pixel values at the sampling points #1 and #2 of the interpolated image are set to the pixel value "1" at the sampling point #1 of the original image which is nearest thereto. The pixel value at the sampling point #3 of the interpolated image is set to the pixel value "0" at the sampling point #2 of the original image which is nearest thereto. Similarly, the pixel values of the interpolated image are subsequently set to "0", "1", "1", "1", "1", "0", .... Thus, in FIG. 3, the interpolated image has a repetitive pattern of the pixel values "0", "1", "1".

As described above, when original images having the same array of pixel values are subjected to the same nearest interpolation, an interpolated image having a repetitive pattern of the pixel values "1", "0", "0" and an interpolated image having a repetitive pattern of the pixel values "0", "1", "1" are produced.

Different interpolated images may be generated from original images which have the same array of pixel values, but are kept out of phase with each other, according to not only the nearest interpolation, but also other interpolation processes, e.g., linear interpolation and cubic interpolation.

It is not preferable to produce different interpolated images from images which have the same array of pixel values, i.e., which have the same image appearance as each other.

SUMMARY OF THE INVENTION

It is therefore an object of the present invention to provide a data processing apparatus, a data processing method, a program, and a recording medium for easily producing optimum interpolated data of an image, for example.

According to an aspect of the present invention, there is provided a data processing apparatus for converting discrete first data into second data having a different number of sampling data from the first data, including generating means for generating a plurality of the second data from the first data, first virtualizing means for generating first virtual data including a virtual succession of the first data, second virtualizing means for generating second virtual data including a virtual succession of each of the plural second data, error calculating means for calculating an error between each of the second virtual data with respect to the plural second data and the first virtual data, and selecting means for selecting either one of the plural second data based on the error.

According to another aspect of the present invention, there is provided a data processing method of converting discrete first data into second data having a different number of sampling data from the first data, including the steps of generating a plurality of the second data from the first data, generating first virtual data including a virtual succession of the first data, generating second virtual data including a virtual succession of each of the plural second data, calculating an error between each of the second virtual data with respect to the plural second data and the first virtual data, and selecting either one of the plural second data based on the error.

According to still another aspect of the present invention, there is provided a program for enabling a computer to perform a data processing process for converting discrete first data into second data having a different number of sampling data from the first data, including the steps of generating a plurality of the second data from the first data, generating first virtual data including a virtual succession of the first data, generating second virtual data including a virtual succession of each of the plural second data, calculating an error between each of the second virtual data with respect to the plural second data and the first virtual data, and selecting either one of the plural second data based on the error.

According to yet another aspect of the present invention, there is provided a recording medium storing a program for enabling a computer to perform a data processing process for converting discrete first data into second data having a different number of sampling data from the first data, the program including the steps of generating a plurality of the second data from the first data, generating first virtual data including a virtual succession of the first data, generating second virtual data including a virtual succession of each of the plural second data, calculating an error between each of the second virtual data with respect to the plural second data and the first virtual data, and selecting either one of the plural second data based on the error.

With the arrangement of the present invention, a plurality of second data are generated from first data, first virtual data including a succession of the first data are generated, and second virtual data including a virtual succession of each of the plural second data are generated. An error between each of the second virtual data with respect to the plural second data and the first virtual data is calculated, and either one of the plural second data is selected based on the error.

The present invention makes it possible to optimum interpolated results with ease.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 19 is a block diagram of a computer according to an embodiment of the present invention.

DETAILED DESCRIPTION OF THE PREFERRED EMBODIMENTS

Figure 1:
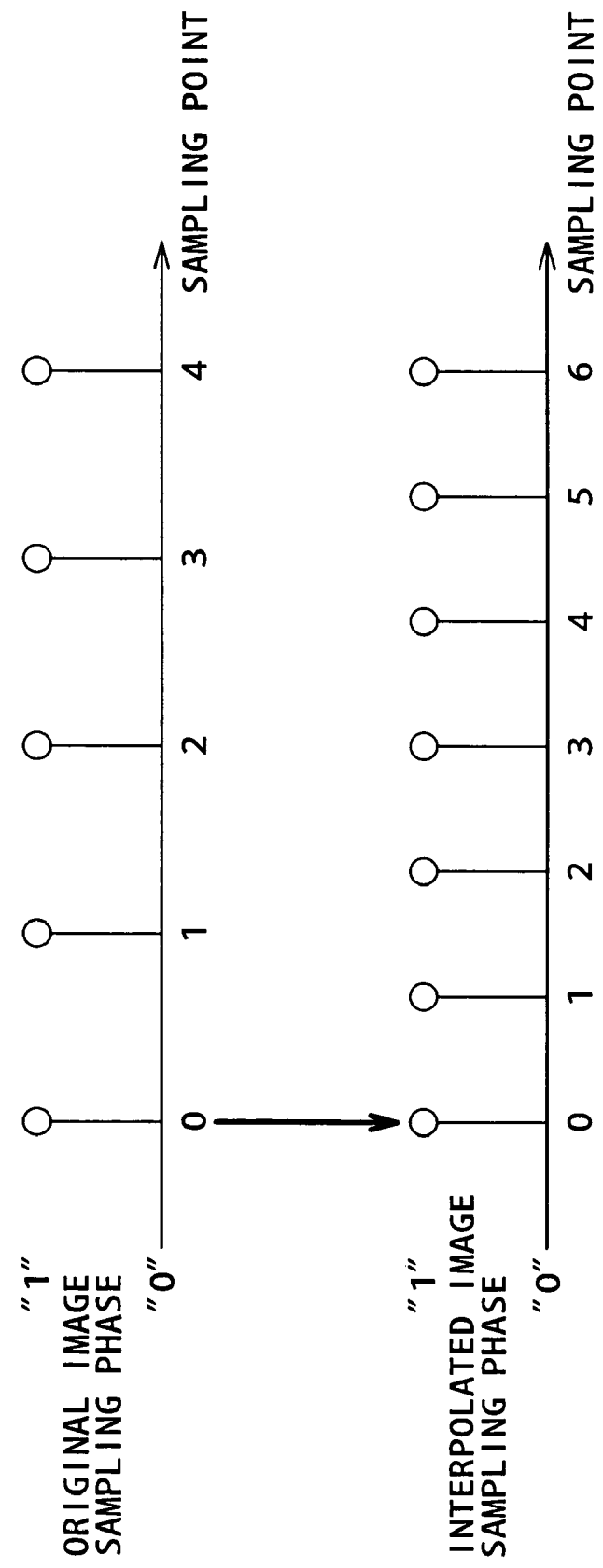
FIG. 1 is a diagram illustrating image data processed by a conventional interpolation process.
Figure 2:
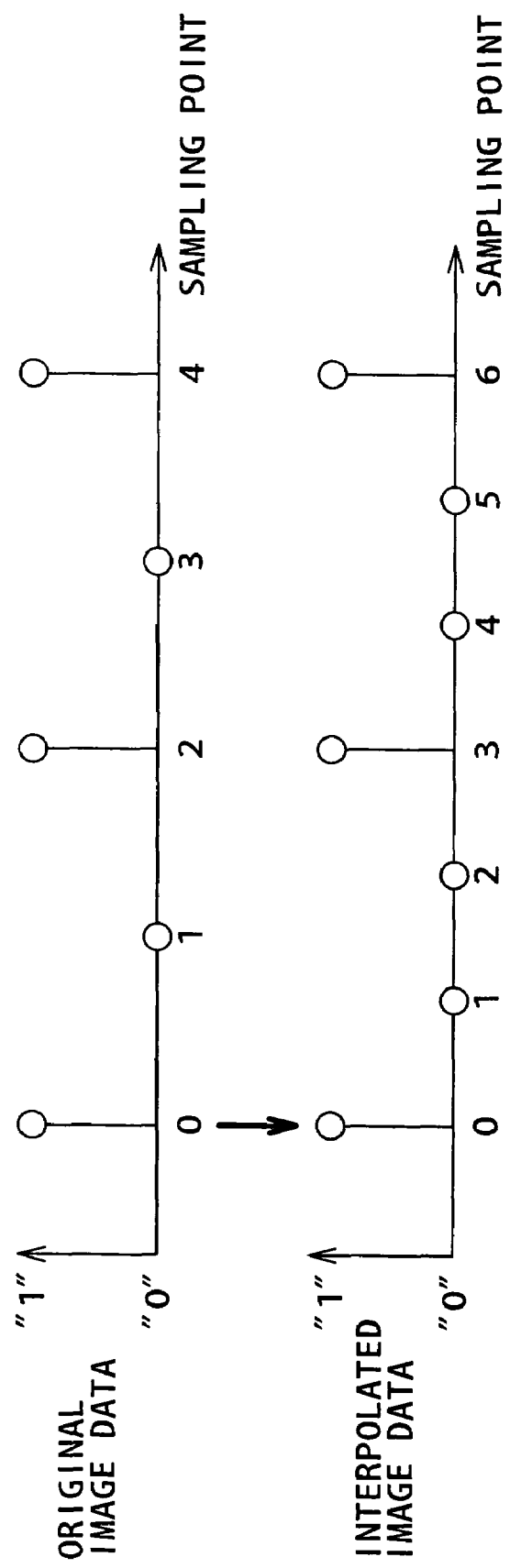
FIG. 2 is a diagram illustrating other image data processed by the conventional interpolation process.
Figure 3:
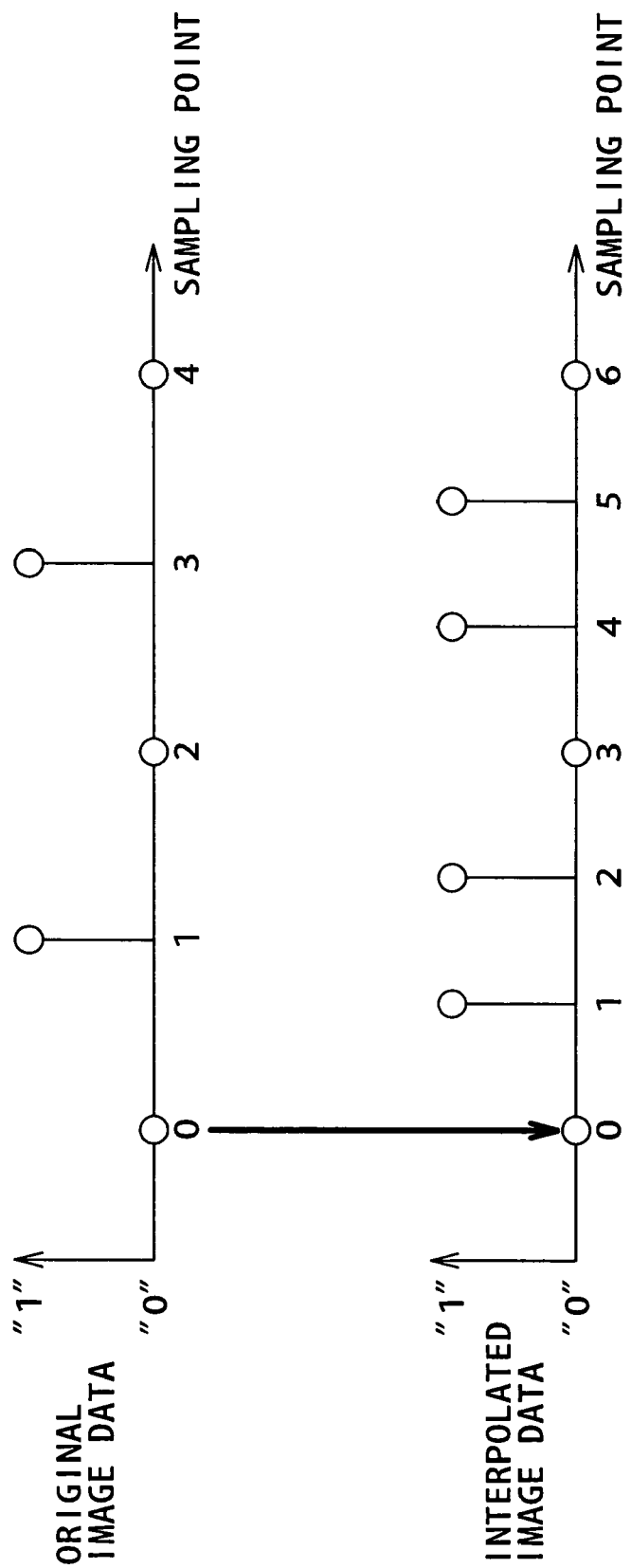
FIG. 3 is a diagram illustrating still other image data processed by the conventional interpolation process.

Preferred embodiments of the present invention will be described below. Prior to the description of the preferred embodiments, however, the principles of the invention disclosed herein will be described below. The description of the present invention in the present specification does not mean that other inventions are not disclosed in the specification and does not deny the existence of possible inventions which may be filed in divisional applications or added by way of amendments in the future.

The present specification discloses at least a data processing apparatus. The data processing apparatus is a data processing apparatus (e.g., an image processing apparatus shown in FIG. 4) for converting discrete first data (e.g., original image data) into second data (e.g., interpolated image data) having a different number of sampling data from the first data, and includes generating means (e.g., a nearest interpolator 21, a linear interpolator 22, or a cubic interpolator 23 shown in FIG. 9) for generating a plurality of the second data from the first data, first virtualizing means (e.g., a virtualizer 24 shown in FIG. 9) for generating first virtual data including a virtual succession of the first data, second virtualizing means (e.g., a virtualizer 25, 26, or 27 shown in FIG. 9) for generating second virtual data including a virtual succession of each of the plural second data, error calculating means (e.g., an error calculator 28, 29, or 30 shown in FIG. 9) for calculating an error between each of the second virtual data with respect to the plural second data and the first virtual data, and selecting means (e.g., an interpolation process selector 32 shown in FIG. 9) for selecting either one of the plural second data based on the error.

The generating means may generate the second data with respect to each of a plurality of phases of sampling points of the second data, and the selecting means may select one of the second data generated with respect to the phases which minimizes the error.

The generating means may generate the second data according to each of a plurality of interpolation processes (e.g., a nearest interpolation process, a linear interpolation process, and a cubic interpolation process), and the selecting means may select one of the second data generated according to each of the interpolation processes which minimizes the error.

The generating means may generate the second data with respect to each of a plurality of phases of sampling points of the second data according to each of a plurality of interpolation processes, and the selecting means may select one of the second data generated according to each of the interpolation processes which minimizes the error, with respect to one of the phases which minimizes an accumulated value of the error.

The first or second virtualizing means may generate the first or second virtual data by performing 0th-order interpolation on the first or second data.

The first and second data may include image data.

The data processing apparatus may further include area detecting means (e.g., a character area detector 11 shown in FIG. 4) for detecting a character area including a character in part or entirety from original image data, and the generating means may generate the plural second data from image data of the character area as the first data.

The data processing apparatus may further include combining means (e.g., a combiner 19 shown in FIG. 4) for combining the original image data and the second data selected by the selecting means with each other.

The present specification also discloses a data processing method. The data processing method is a data processing method for converting discrete first data (e.g., original image data) into second data (e.g., interpolated image data) having a different number of sampling data from the first data, and includes the generating step (e.g., step S34 shown in FIG. 15) of generating a plurality of the second data from the first data, the first virtualizing step (e.g., step S31 shown in FIG. 15) of generating first virtual data including a virtual succession of the first data, the second virtualizing step (e.g., step S35 shown in FIG. 15) of generating second virtual data including a virtual succession of each of the plural second data, the error calculating step (e.g., step S37 shown in FIG. 15 or step S55 shown in FIG. 16) of calculating an error between each of the second virtual data with respect to the plural second data and the first virtual data, and the selecting step (e.g., step S57 shown in FIG. 17) of selecting either one of the plural second data based on the error.

The present specification also discloses a program. The program include a program for enabling a computer to perform a data processing process for converting discrete first data (e.g., original image data) into second data (e.g., interpolated image data) having a different number of sampling data from the first data, and includes the generating step (e.g., step S34 shown in FIG. 15) of generating a plurality of the second data from the first data, the first virtualizing step (e.g., step S31 shown in FIG. 15) of generating first virtual data including a virtual succession of the first data, the second virtualizing step (e.g., step S35 shown in FIG. 15) of generating second virtual data including a virtual succession of each of the plural second data, the error calculating step (e.g., step S37 shown in FIG. 15 or step S55 shown in FIG. 16) of calculating an error between each of the second virtual data with respect to the plural second data and the first virtual data, and the selecting step (e.g., step S57 shown in FIG. 57) of selecting either one of the plural second data based on the error.

The program may be stored in a recording medium.

Embodiments of the present invention will be described in detail with reference to the drawings.

Figure 4:
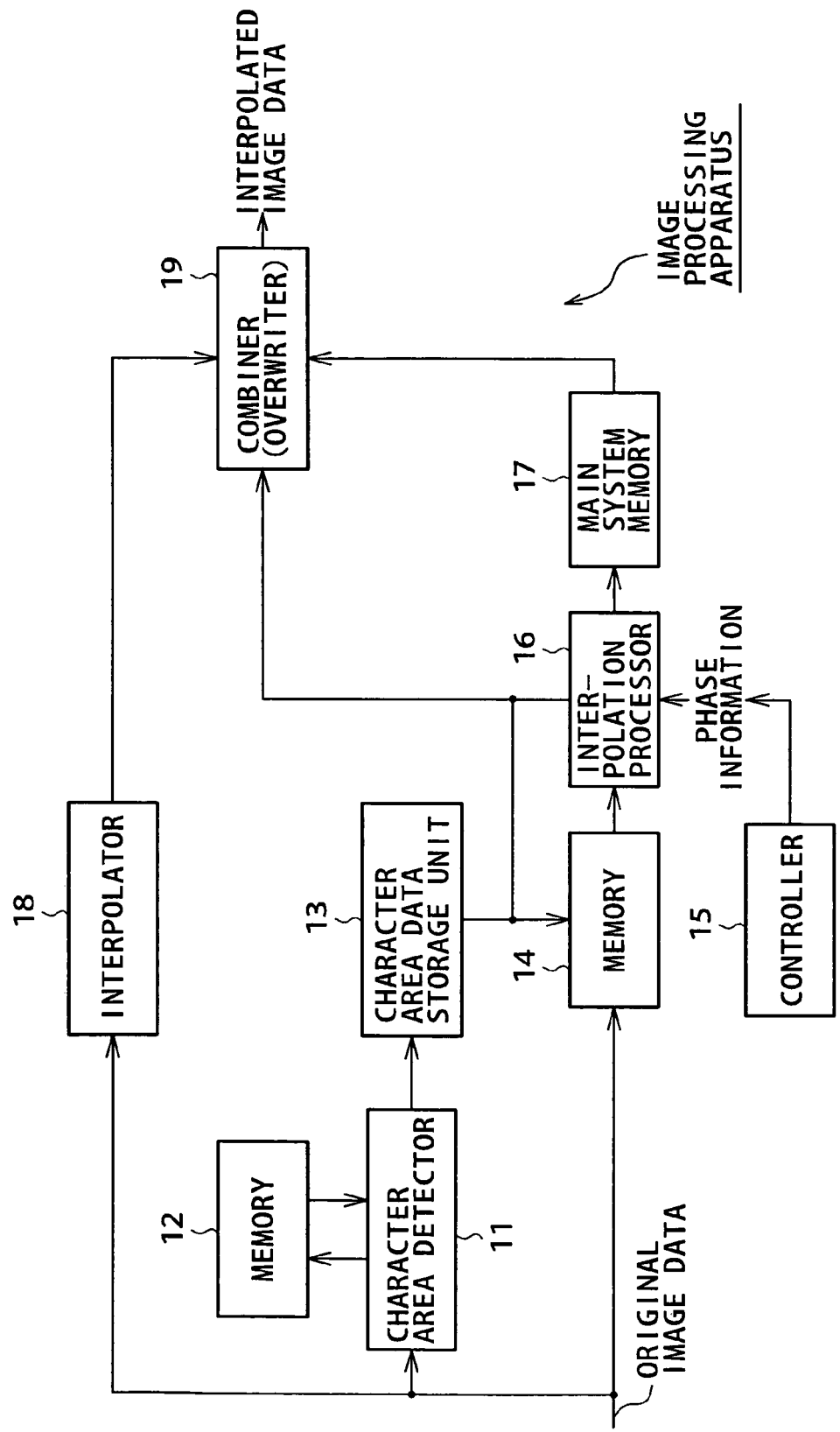
FIG. 4 is a block diagram of an image processing apparatus according to an embodiment of the present invention.

FIG. 4 shows in block form an image processing apparatus according to an embodiment of the present invention.

The image processing apparatus generates interpolated image data from original image data by interpolating the original image data.

The original image data, which have values at pixels (pixel values) as discrete sampling points to be interpolated are supplied to a character area detector 11, a memory 14, and an interpolator 18.

The character area detector 11 detects a character area including a character (text) in part or entirety from the original image data supplied thereto, and supplies area data representing (specifying) the character area to a character area data storage unit 13.

The memory 12 includes a so-called working memory that is used by the character area detector 11 in its processing operation.

The character area data storage unit 13 stores the area data supplied from the character area detector 11, and supplies the area data to the memory 14, an interpolation processor 16, and a combiner 19 when necessary.

The memory 14 stores the original image data supplied thereto. The memory 14 also reads original image data of the character area represented by the area data stored in the character area data storage unit 13, and supplies the read original image data to the interpolation processor 16.

A controller 15 outputs phase information, to be described later, to the interpolation processor 16. The controller 15 also controls the image processing apparatus shown in FIG. 4 in its entirety.

The interpolation processor 16 performs an interpolation process, to be described later, on the original image data of the character area supplied from the memory 14 based on the area data from the character area data storage unit 13 and the phase information from the controller 15, and supplies interpolated image data of the character area produced by the interpolation process to a main system memory 17.

The main system memory 17 stores the interpolated image data of the character area supplied from the interpolation processor 16, and supplies the interpolated image data to the combiner 19 when necessary.

The interpolator 18 performs a predetermined interpolation process, e.g., a cubic interpolation process, on one frame (or one field) of original image data supplied thereto, and supplies interpolated image data produced by the interpolation process to the combiner 19.

The combiner 19 combines the interpolated image data of the original image data in its entirety supplied from the interpolator 18 and the interpolated image data of the character area supplied from the main system memory 17 with each other based on the area data supplied from the character area data storage unit 13. Specifically, the combiner 19 overwrites the character data, represented by the area data, of the interpolated image data of the entire original image data supplied from the interpolator 18, with the interpolated image data of the character area supplied from the main system memory 17, and outputs resultant combined image data as final interpolated image data of the entire original image data.

Figure 5:
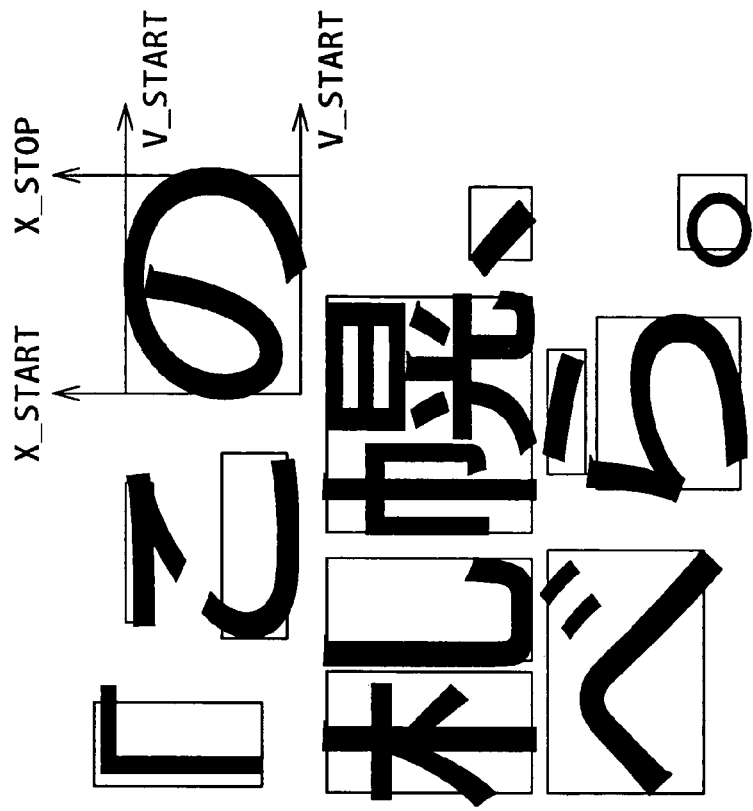
FIG. 5 is a diagram illustrating area data.

FIG. 5 shows character areas detected by the character area detector 11 shown in FIG. 4. If the original image data include a character or a string of characters as shown in a left section of FIG. 5 (FIG. 5 shows a string of Japanese characters by way of example), then the character area detector 11 detects rectangular areas including the string of characters in part or entirety as character areas, as shown in a right section of FIG. 5. The character area detector 11 determines a coordinate X_start of the left end of each of the character areas, a coordinate X_stop of the right end of each of the character areas, a coordinate V_start of the upper end of each of the character areas, and a coordinate V_stop of the lower end of each of the character areas, and outputs the determined coordinates as area data.

A process of detecting a character area, which is performed by the character area detector 11 shown in FIG. 4, will be described below with reference to FIGS. 6 and 7.

Figure 6:
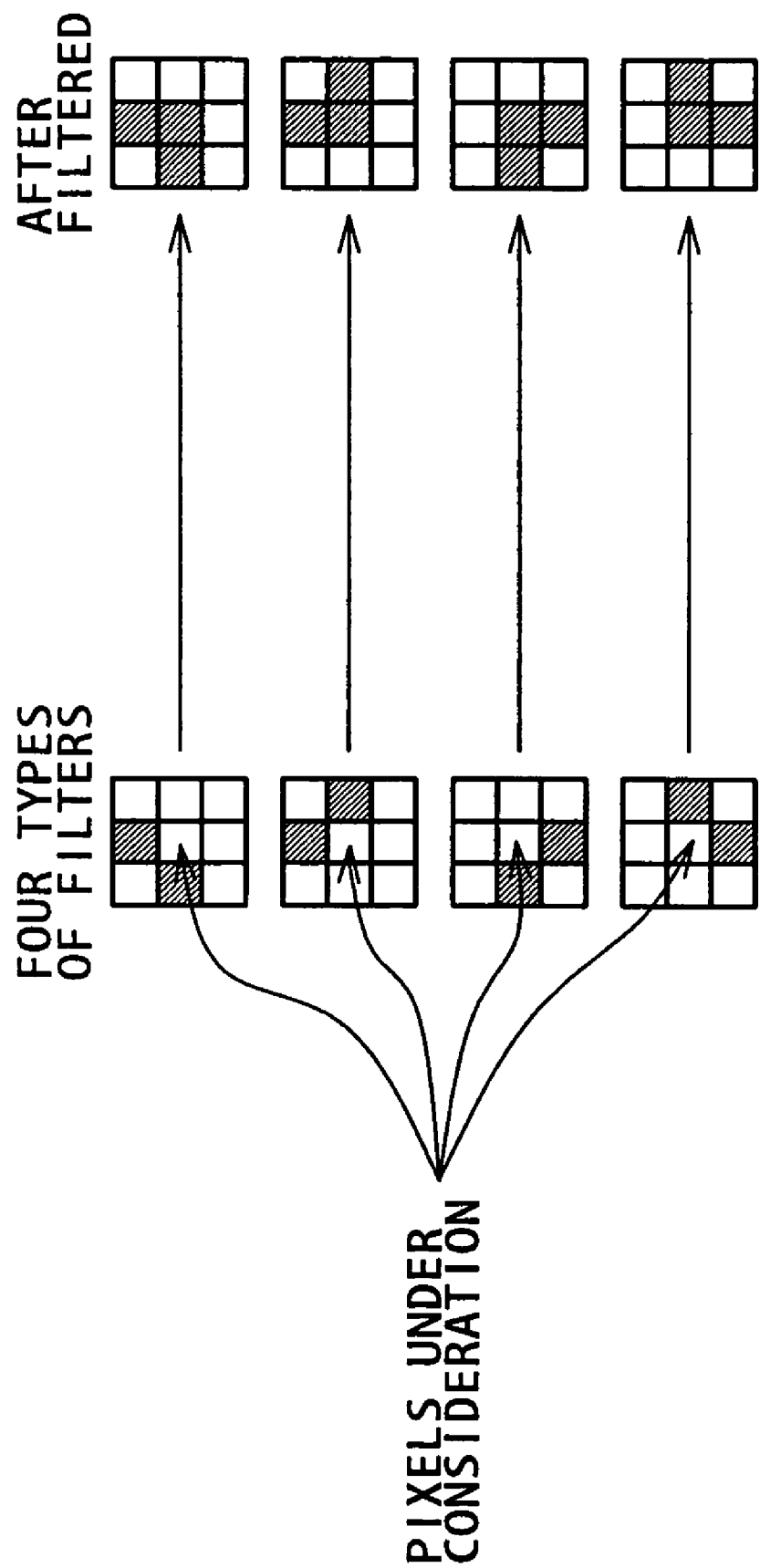
FIG. 6 is a diagram illustrating a processing sequence of a character area detector of the image processing apparatus.

The character area detector 11 has four types of filters as shown in FIG. 6, for example.

The four types of filters include a first filter for changing the pixel value of a pixel under consideration into a character pixel value only when two adjacent pixels positioned upwardly and leftwardly of the pixel under consideration have character pixel values, a second filter for changing the pixel value of a pixel under consideration into a character pixel value only when two adjacent pixels positioned upwardly and rightwardly of the pixel under consideration have character pixel values, a third filter for changing the pixel value of a pixel under consideration into a character pixel value only when two adjacent pixels positioned downwardly and leftwardly of the pixel under consideration have character pixel values, and a fourth filter for changing the pixel value of a pixel under consideration into a character pixel value only when two adjacent pixels positioned downwardly and rightwardly of the pixel under consideration have character pixel values.

The character area detector 11 detects a rectangular area made up of character pixel values, which is obtained by filtering an original image with the above four types of filters, as a character area.

Figure 7:
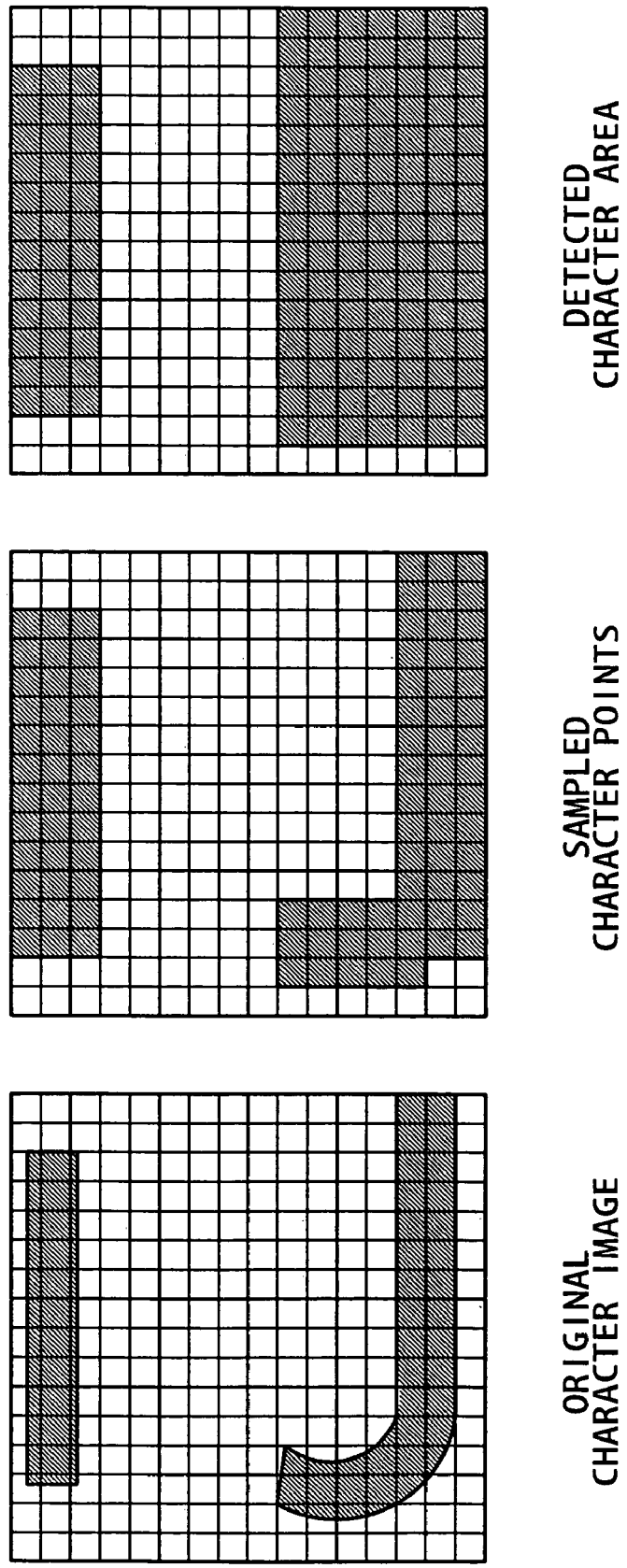
FIG. 7 is a diagram illustrating the processing sequence of the character area detector of the image processing apparatus.

For example, a character shown in a left section of FIG. 7 (FIG. 7 shows a Japanese character by way of example), in the form of discrete original image data which take values (pixel values) only at pixels as sampling points, is displayed as shown in a second section to the left of FIG. 7.

In FIG. 7, square units represent pixels, and shaded pixels have character pixel values.

The character area detector 11 filters the pixels making up the original image data shown in the second section to the left of FIG. 7 successively in a raster scan sequence, using the four types of filters shown in FIG. 6, and produces filtered data as shown in a right section of FIG. 7. In the illustrated example, the character area detector 11 detects a rectangular area made up of only upper character pixel values shown in the right section of FIG. 7 and a rectangular area made up of only lower character pixel values shown in the right section of FIG. 7 as character areas.

According to the process of detecting a character area described above with reference to FIGS. 6 and 7, a rectangular area including one or more characters in their entirety may be detected as a character area, and a rectangular area including a left or right radical of a character or another portion of a character may be detected as a character area.

The process of detecting a character area, which is performed by the character area detector 11, is not limited to the process described above with reference to FIGS. 6 and 7.

If the size and displayed position of a character of original image data are known, such as when the character is on OSD, then it is possible to detect character areas from the size and displayed position.

Figure 8:
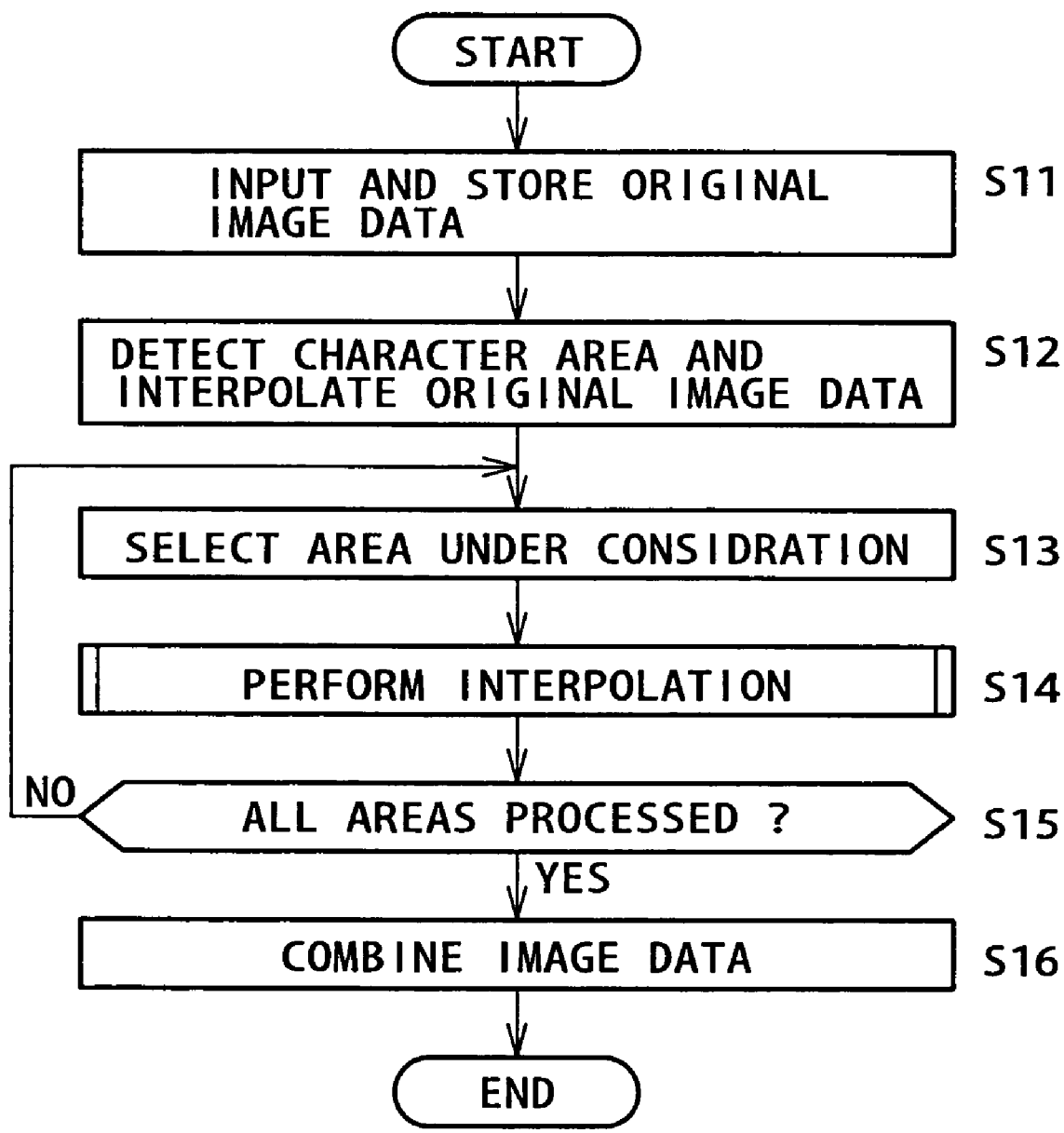
FIG. 8 is a flowchart of a processing sequence of the image processing apparatus.

A processing sequence of the image processing apparatus shown in FIG. 4 will be described below with reference to FIG. 8.

In step S11, discrete original image data to be interpolated are supplied to the image processing apparatus shown in FIG. 4. Specifically, the original image data are supplied to the character area detector 11, the memory 14, and the interpolator 18. The memory 14 stores the supplied original image data. Then, control goes from step S11 to step S12.

In step S12, the character area detector 11 detects a character area from the original image data, and the interpolator 18 performs a predetermined interpolation process on the overall original image data supplied thereto.

Specifically, the character area detector 11 resets any stored data in the memory 12 to 0. The character area detector 11 then detects pixels (sampling points) whose pixel values are character pixel values in the original image data, and writes 1-bit 1s at addresses in the memory 12 which corresponds to those pixels. Thereafter, the character area detector 11 filters the stored values in the memory 12 with the four types of filters shown in FIG. 6, using 1-bit 1s as character pixel values, and detects a rectangular area made up of only character pixel values (1-bit 1s) as shown in FIG. 7, as a character area. The character area detector 11 determines area data representing the character area, and supplies the area data to the character area data storage unit 13, which stores the supplied area data.

The interpolator 18 performs a cubic interpolation process, for example, on the whole original image data, and supplies produced interpolated image data to the combiner 19.

If the character area detector 11 fails to detect character areas from the original image data, then the combiner 19 outputs the interpolated image data supplied from the interpolator 18 directly as final interpolated image data. Thereafter, the processing sequence is put to an end.

If the character area detector 11 detects a plurality of character areas from the original image data, then the character area detector 11 determines area data with respect to each of the character areas, and supplies the area data to the character area data storage unit 13, which stores the supplied area data.

Control then goes from step S12 to step S13. In step S13, the character area data storage unit 13 selects one, not yet made an area under consideration, of one or more character areas represented by the area data stored in step S12, as an area under consideration, and supplies area data representing the selected area under consideration to the memory 14, the interpolation processor 16, and the combiner 19. In step S13, the memory 14 reads original image data in the area under consideration represented by the area data supplied from the character area data storage unit 13, of the original image data stored in the memory 14, and supplies the read original image data to the interpolation processor 16. Then, control goes from step 13 to step S14.

In step S14, the interpolation processor 16 performs an interpolation process, to be described later, on the original image data in the area under consideration supplied from the memory 14, and supplies the interpolated image data to the main system memory 17, which stores the interpolated image data therein. Control then goes to step S15.

In step S15, it is determined whether the character area data storage unit 13 has selected all the one or more character areas represented by the area data stored in step S12 as areas under consideration or not. If it is determined in step S15 that the character area data storage unit 13 has not selected all the one or more character areas represented by the area data stored in step S12 as areas under consideration, then control returns to step S13 in which the character area data storage unit 13 selects a character area, not yet made an area under consideration, as an area under consideration. Thereafter, the processing in steps S14, S15 is repeated.

If it is determined in step S15 that the character area data storage unit 13 has selected all the one or more character areas represented by the area data stored in step S12 as areas under consideration, i.e., if all the one or more character areas represented by the area data stored by character area data storage unit 13 are interpolated by the interpolation processor 16 and the interpolated image data are stored in the main system memory 17, then control goes to step 16. In step S16, the combiner 19 overwrites the one or more character areas represented by the area data supplied from the character area data storage unit 13, of the interpolated image data of the entire original image data supplied from the interpolator 18, with the interpolated image data of the character area or areas stored in the main system memory 17, and outputs resultant combined image data as final interpolated image data of the entire original image data. Thereafter, the processing sequence of the image processing apparatus is put to an end.

The interpolated image data output from the combiner 19 are supplied to a display unit such as a CRT, a liquid crystal display panel, a PDP (Plasma Display Panel), or the like, which displays the interpolated image data partly or wholly. If the interpolated image data output from the combiner 19 include an increased number of pixels from the original image data, then the display panel displays an enlarged image represented by an enlargement of the original image data. Conversely, if the interpolated image data output from the combiner 19 include a reduced number of pixels from the original image data, then the display panel displays a reduced image represented by a reduction of the original image data.

Figure 9:
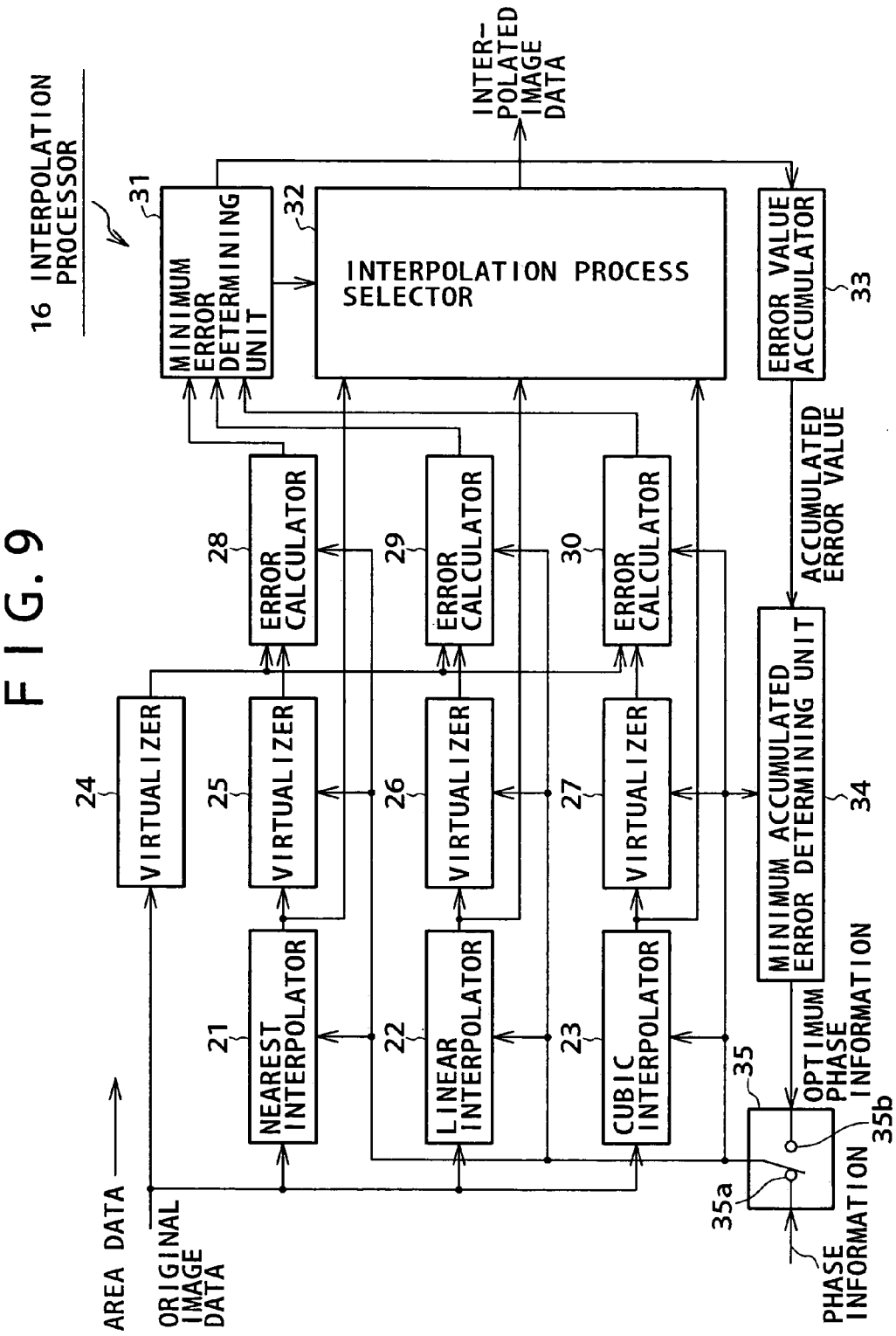
FIG. 9 is a block diagram of an interpolation processor of the image processing apparatus.

FIG. 9 shows in block form the interpolation processor 16 of the image processing apparatus shown in FIG. 4.

As shown in FIG. 9, the original image data of an area under consideration from the memory 14 shown in FIG. 4 is supplied to a nearest interpolator 21, a linear interpolator 22, a cubic interpolator 23, and a virtualizer 24.

The phase information from the controller 15 shown in FIG. 4 is supplied to a terminal 35a of a switch 35. The phase information is then supplied through the switch 35 to the nearest interpolator 21, the linear interpolator 22, the cubic interpolator 23, virtualizers 25, 26, 27, error calculators 28, 29, 30, and a minimum accumulated error determining unit 34.

The area data representing the area under consideration from the character area data storage unit 13 shown in FIG. 4 is supplied to required blocks of the interpolation processor 16 shown in FIG. 9. The area data is used to recognize the area under consideration.

The nearest interpolator 21 performs a nearest interpolation process on the original image data of the area under consideration that is supplied thereto, thereby generating interpolated image data which is supplied to the virtualizer 25 and an interpolation process selector 32.

The nearest interpolator 21 generates interpolated image data that is held out of phase with sampling points (pixels) of the original image data by the phase represented by the phase information supplied through the switch 35. Since the phase information is provided in a plurality of items, as described later, the nearest interpolator 21 generates a plurality of interpolated image data that are held out of phase with sampling points (pixels) of the original image data.

The linear interpolator 22 performs a linear interpolation on the original image data of the area under consideration that is supplied thereto, thereby generating interpolated image data which is supplied to the virtualizer 26 and the interpolation process selector 32. As with the nearest interpolator 21, the linear interpolator 22 generates a plurality of interpolated image data that are held out of phase with sampling points (pixels) of the original image data by the phase represented by the phase information supplied through the switch 35.

The cubic interpolator 23 performs a cubic interpolation on the original image data of the area under consideration that is supplied thereto, thereby generating interpolated image data which is supplied to the virtualizer 27 and the interpolation process selector 32. As with the nearest interpolator 21, the cubic interpolator 23 generates a plurality of interpolated image data that are held out of phase with sampling points (pixels) of the original image data by the phase represented by the phase information supplied through the switch 35.

The virtualizer 24 generates virtual original image data including a virtual succession of the original image data of the area under consideration that is supplied thereto, and supplies the generated virtual original image data to the error calculators 28 through 30.

The virtualizer 25 generates virtual interpolated image data including a virtual succession of each of the interpolated image data supplied from the nearest interpolator 21, and supplies the generated virtual interpolated image data to the error calculator 28. The virtualizer 26 generates virtual interpolated image data including a virtual succession of each of the interpolated image data supplied from the linear interpolator 22, and supplies the generated virtual interpolated image data to the error calculator 29. The virtualizer 27 generates virtual interpolated image data including a virtual succession of each of the interpolated image data supplied from the cubic interpolator 23, and supplies the generated virtual interpolated image data to the error calculator 30.

Details of the virtual original image data and the virtual interpolated image data will be described later.

The error calculator 28 determines an error between the virtual original image data from the virtualizer 24 and the virtual interpolated image data from the virtualizer 25, and supplies the determined error to a minimum error determining unit 31. The error calculator 29 determines an error between the virtual original image data from the virtualizer 24 and the virtual interpolated image data from the virtualizer 26, and supplies the determined error to the minimum error determining unit 31. The error calculator 30 determines an error between the virtual original image data from the virtualizer 24 and the virtual interpolated image data from the virtualizer 27, and supplies the determined error to the minimum error determining unit 31.

The minimum error determining unit 31 determines a minimum error representing a smallest one of the errors that are supplied from the error calculators 28 through 30, and supplies the determined minimum error to an error value accumulator 33. The minimum error determining unit 31 controls the interpolation process selector 32 based on the minimum error.

The interpolation process selector 32 is controlled by the minimum error determining unit 31 to select either one of the interpolated image data that are output from the nearest interpolator 21, the linear interpolator 22, and the cubic interpolator 23, and output the selected interpolated image data as interpolated image data of the area under consideration.

The error value accumulator 33 accumulates (adds) minimum errors supplied from the minimum error determining unit 31, determines an accumulated error as the accumulated value of those minimum errors, and supplies the accumulated error to the minimum accumulated error determining unit 34.

The minimum accumulated error determining unit 34 is supplied with the phase information through the switch 35 as well as the accumulated error from the error value accumulator 33. The minimum accumulated error determining unit 34 stores the accumulated error supplied from the error value accumulator 33 in association with the phase information supplied through the switch 35. The minimum accumulated error determining unit 34 also determines a minimum accumulated error representing a minimum one of accumulated errors that are stored in association with respective items of phase information, to be described later, and supplies the phase information associated with the determined minimum accumulated error, as optimum phase information best suited to the interpolation on the original image data of the area under consideration, to a terminal 35b of the switch 35.

The switch 35 selects the terminal 35a or the terminal 35b at a time. When the switch 35 selects the terminal 35a, the switch 35 supplies the phase information from the controller 15 shown in FIG. 4 to the nearest interpolator 21, the linear interpolator 22, the cubic interpolator 23, the virtualizers 25, 26, 27, the error calculators 28, 29, 30, and the minimum accumulated error determining unit 34. When the switch 35 selects the terminal 35b, the switch 35 supplies the optimum phase information from the minimum accumulated error determining unit 34 to the nearest interpolator 21, the linear interpolator 22, the cubic interpolator 23, the virtualizers 25, 26, 27, and the error calculators 28, 29, 30.

The phase information supplied from the controller 15 shown in FIG. 4 to the terminal 35a of the switch 35 shown in FIG. 9 will be described below with reference to FIG. 10.

The controller 15 sets a plurality of phases for sampling points of interpolated image data based on sampling points of original image data, and supplies a plurality of items of phase information representing the respective phases to the switch 35.

For the sake of brevity, it is assumed that the controller 35 sets three phases $-\Delta$, 0, $+\Delta$ based on sampling points of original image data, and successively supplies respective items of phase information representing those three phases to the switch 35.

The nearest interpolator 21, the linear interpolator 22, and the cubic interpolator 23 are supplied with the respective items of phase information representing the phases $-\Delta$, 0, $+\Delta$ through the switch 35.

Figure 10:
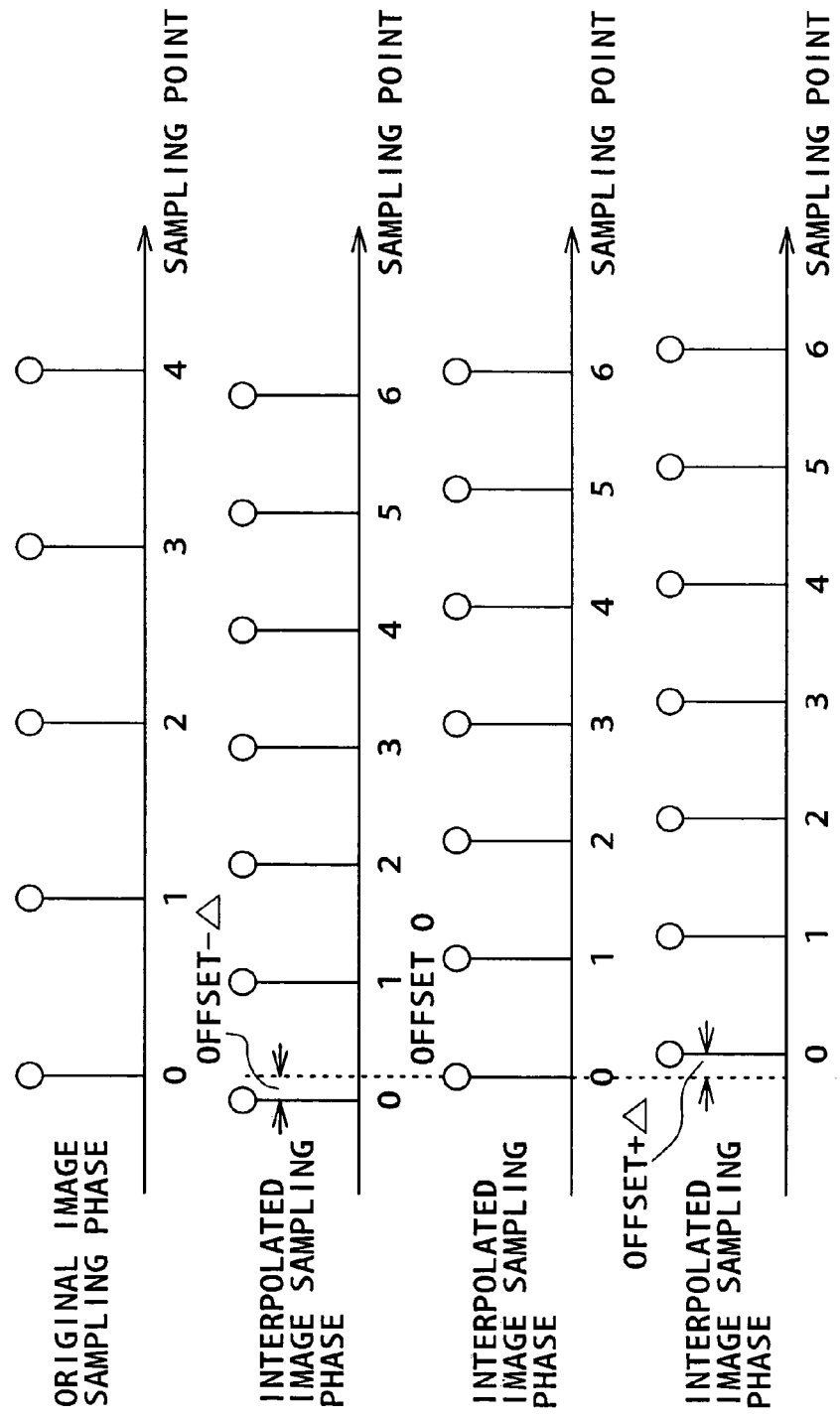
FIG. 10 is a diagram illustrating phase information.

When the nearest interpolator 21 is supplied with the item of phase information representing the phase $-\Delta$, the nearest interpolator 21 generates interpolated image data according to the nearest interpolation process, which have a sampling point (pixel) #0 that is shifted by the phase $-\Delta$, as shown in the second figure from above in FIG. 10, from a sampling point #0 of original image data as shown in the first figure from above in FIG. 10. When the nearest interpolator 21 is supplied with the item of phase information representing the phase 0, the nearest interpolator 21 generates interpolated image data according to the nearest interpolation process, which have a sampling point (pixel) #0 that is shifted by the phase 0, as shown in the third figure from above in FIG. 10, from a sampling point #0 of original image data, i.e., which have a sampling point (pixel) #0 aligned with a sampling point #0 of original image data, as shown in the first figure from above in FIG. 10. When the nearest interpolator 21 is supplied with the item of phase information representing the phase +Δ, the nearest interpolator 21 generates interpolated image data according to the nearest interpolation process, which have a sampling point (pixel) #0 that is shifted by the phase +Δ, as shown in the fourth figure from above in FIG. 10, from a sampling point #0 of original image data as shown in the first figure from above in FIG. 10.

Each of the linear interpolator 22 and the cubic interpolator 23 also generates interpolated image data with respect to the phases represented by the respective items of phase information, in the same manner as with the nearest interpolator 21.

According to the present embodiment, the original image data are interpolated such that the number of pixels in a certain direction of the original image data is multiplied by 3/2. However, the number of pixels in a certain direction of the original image data may be multiplied by a preset fixed value or a variable value which may be changed by the user.

If a two-dimensional coordinate system defined by an x-axis and a y-axis is assumed on a certain frame (or field) of original image data, then the controller 15 shown in FIG. 4 successively supplies items of phase information representing 10 phases (Δx, Δy) to the switch 35 of the interpolation processor 16 shown in FIG. 9.

The absolute value of the phase Δx in the x-axis direction (horizontal direction) which is represented by the phase information is selected to be smaller than the interval between sampling points (pixels) arrayed in the x-axis direction (horizontal direction) of the interpolated image data. Likewise, the absolute value of the phase Δy in the y-axis direction (vertical direction) which is represented by the phase information is selected to be smaller than the interval between sampling points (pixels) arrayed in the y-axis direction of the interpolated image data.

In the above embodiment, the controller 15 shown in FIG. 4 supplies the ten items of phase information to the interpolation processor 16. However, the phase information supplied from the controller 15 to the interpolation processor 16 is not limited to 10 items. The number of items of phase information supplied from the controller 15 to the interpolation processor 16 may be set based on, for example, the processing time of the interpolation processor 16, e.g., a period of time proportional to the number of times that the nearest interpolator 21 or the like calculates interpolated image data.

Virtualization of image data with the virtualizers 24 through 27 shown in FIG. 9 will be described below.

In view of the fact that the original image data supplied to the interpolation processor 16 are image data free of frequency band limitations such as personal computer output data and text data for use on OSD, the virtualizers 24 through 27 perform a virtualizing process for generating virtual image data including a virtual succession of image data by carrying out a 0th-order interpolation process to spread the values (pixel values) of sampling points (pixels) by ±½ samples, for example, spatially, i.e., in the x- and y-axis directions.

Figure 11:
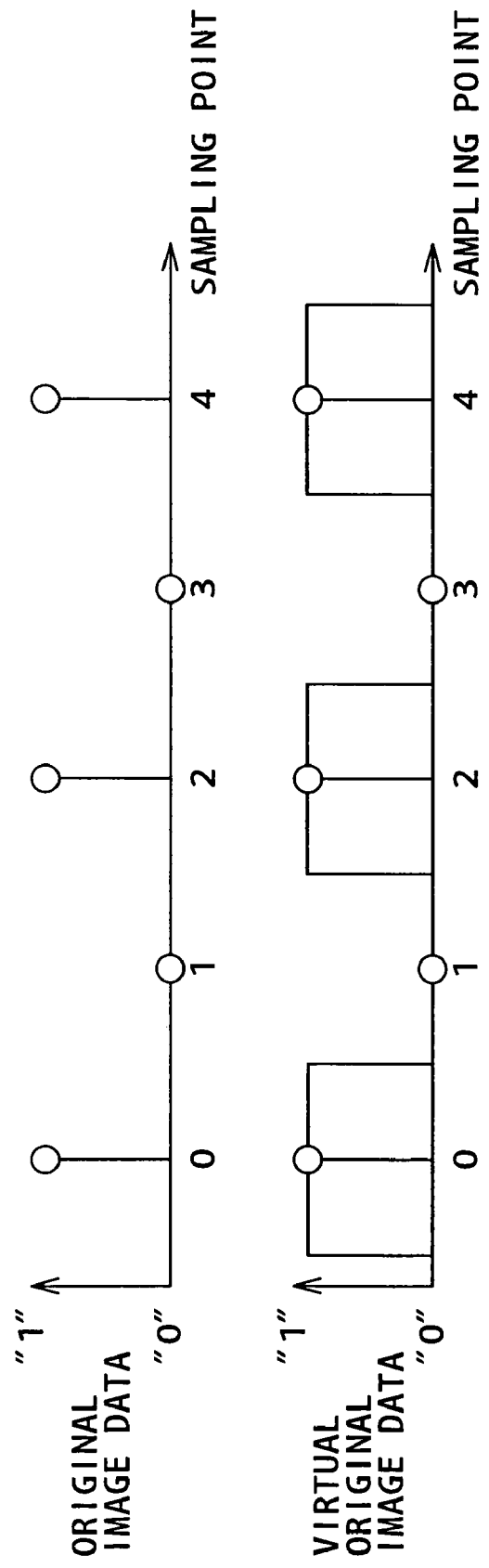
FIG. 11 is a diagram illustrating the manner in which original image data are virtualized.

Specifically, if the original image data supplied to the virtualizer 24 has an alternate pattern of pixel values "1" and "0" as shown in the upper figure in FIG. 11, then the virtualizer 24 spreads the pixel value "1" or "0" at each sampling point by ±½ samples, thereby generating virtual original image data including a virtual succession of original image data, as shown in the lower figure in FIG. 11.

Figure 12:
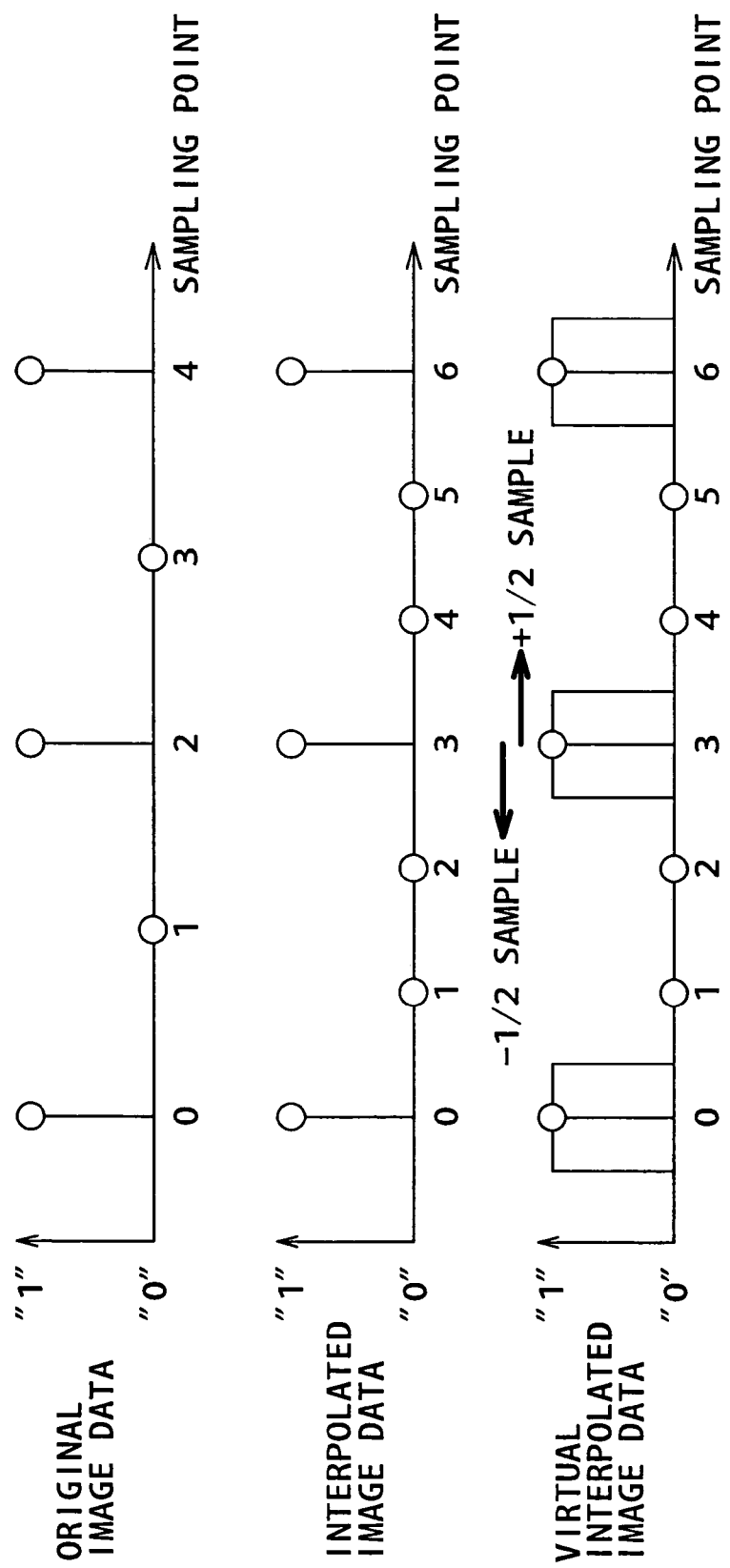
FIG. 12 is a diagram illustrating the manner in which interpolated image data are virtualized.

If the number of sampling points (pixels) of the original image data is to be interpolated by way of nearest interpolation and the phase represented by the phase information is 0, then the nearest interpolator 21 generates interpolated image data having a repetitive pattern of pixel values "1", "0", "0", as shown in the second figure from above in FIG. 12, from the original image data shown in the first figure from above in FIG. 12, which is the same as the original image data shown in the first figure from above in FIG. 11. The virtualizer 25 which virtualizes the interpolated image data from the nearest interpolator 21 spreads the pixel values at the sampling points of the interpolated image data by ±½ samples, (There is a case available to set the spreading range of the pixel values of the interpolated image date so as to be equal to or less than the spreading range of the pixel values of the original image data.) thereby generating virtual interpolated image data including a virtual succession of original image data, as shown in the third figure in FIG. 12.

Each of the virtualizers 26, 27 generates virtual interpolated image data from the interpolated image data supplied from the linear interpolator 22 and the cubic interpolator 23, as with the virtualizer 25.

Figure 13:
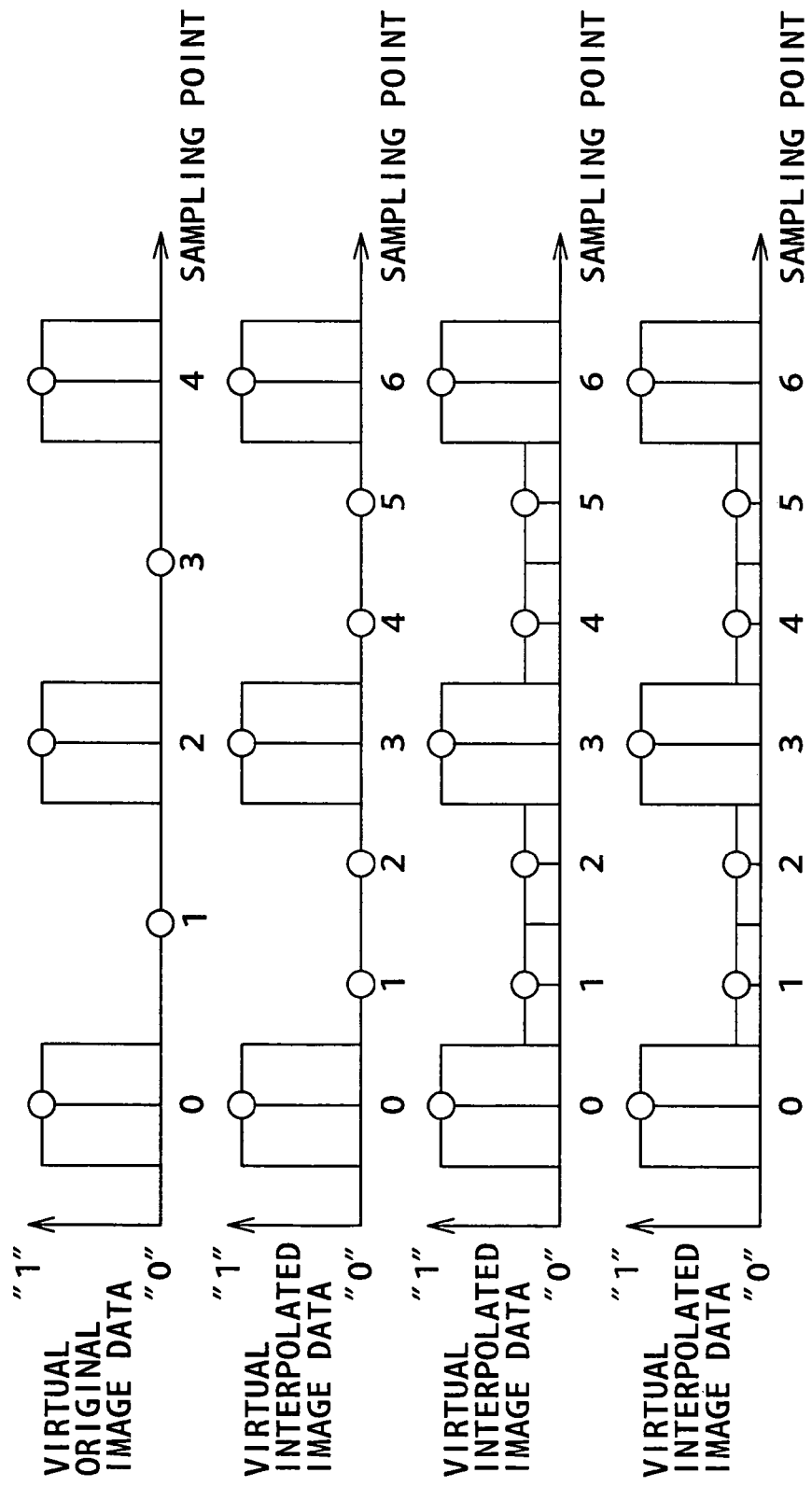
FIG. 13 is a diagram illustrating virtual original image data and virtual interpolated image data.

FIG. 13 shows an example of virtual image data (virtual original image data and virtual interpolated image data) that are obtained by the virtualization performed by the virtualizers 24 through 27 shown in FIG. 9.

The first figure from above in FIG. 13 shows virtual original image data obtained when the virtualizer 24 virtualizes original image data. The second figure from above in FIG. 13 shows virtual interpolated image data obtained when the virtualizer 25 virtualizes interpolated image data that are generated by the nearest interpolator 21 which performs the nearest interpolation on the virtual original image data in the first figure from above in FIG. 13. The third figure from above in FIG. 13 shows virtual interpolated image data obtained when the virtualizer 26 virtualizes interpolated image data that are generated by the linear interpolator 22 which performs the linear interpolation on the virtual original image data in the first figure from above in FIG. 13. The fourth figure from above in FIG. 13 shows virtual interpolated image data obtained when the virtualizer 27 virtualizes interpolated image data that are generated by the cubic interpolator 23 which performs the cubic interpolation on the virtual original image data in the first figure from above in FIG. 13.

In FIG. 13, each of the nearest interpolator 21, the linear interpolator 22, and the cubic interpolator 23 interpolates the original image data to multiply the number of sampling points (pixels) thereof by 3/2, using the phase information representing the phase 0.

By thus virtualizing the original image data and the interpolated image data to generate the virtual original image data and the virtual interpolated image data, each including a virtual succession of pixel values, it is possible to calculate errors between the original image data and the interpolated image data which correspond to each other, using the virtual original image data and the virtual interpolated image data.

Specifically, since the original image data and the interpolated image data have different numbers of sampling points (and may also be out of phase with each other), sampling points of the original image data may not be aligned with sampling points of the interpolated image data, making it difficult to accurately calculate errors between the original image data and the interpolated image data.

However, each of the virtual original image data and the virtual interpolated image data has pixel values represented by successive image data. Using such successive image data, it is possible to calculate errors between the original image data and the interpolated image data at arbitrary sampling points (pixels) of the interpolated image data.

A process for calculating an error between original image data and interpolated image data, which is performed by the error calculators 28 through 30, will be described below with reference to FIG. 14.

Figure 14:
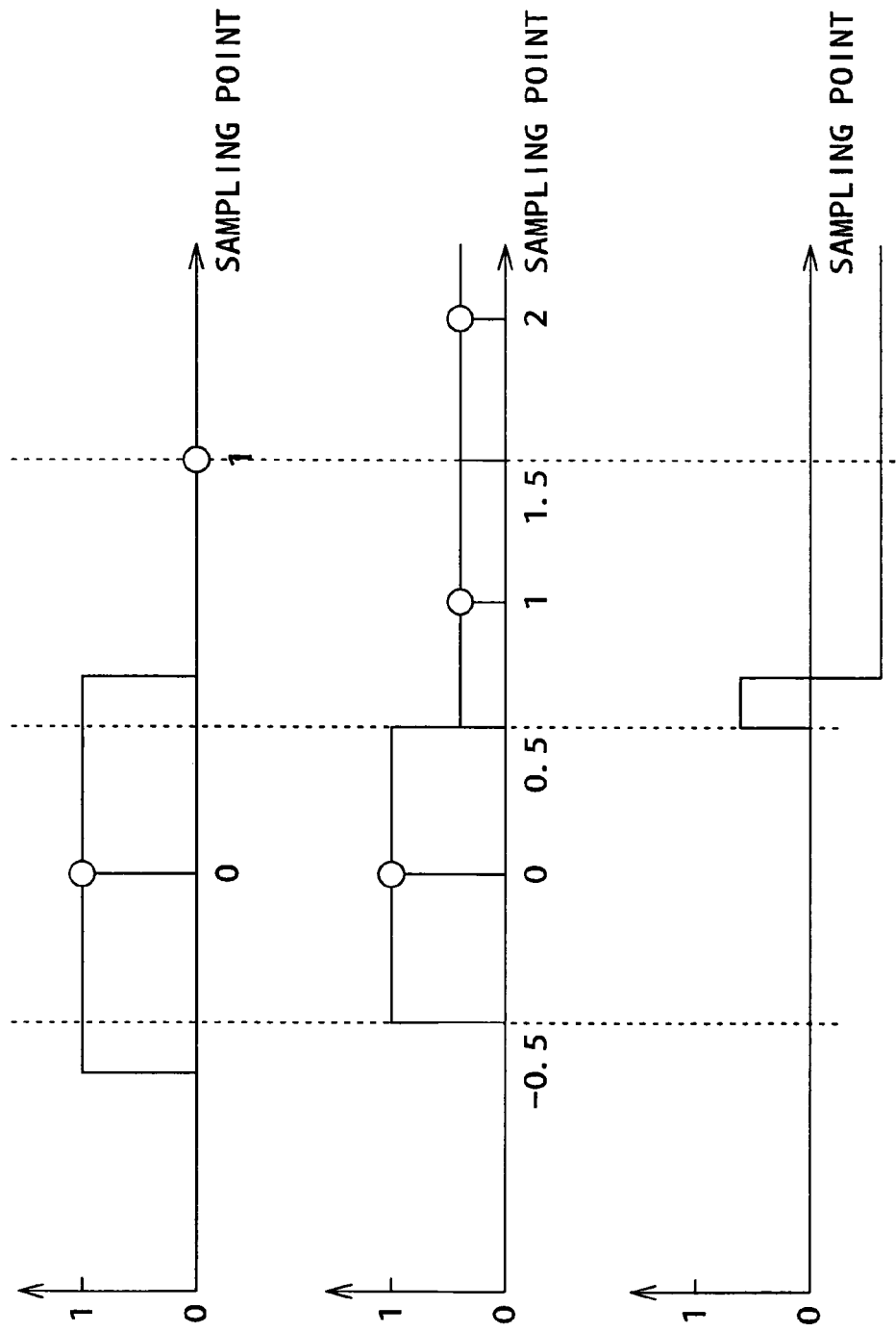
FIG. 14 is a diagram illustrating an error calculation using the virtual original image data and the virtual interpolated image data.

The first figure from above in FIG. 14 shows virtual original image data similar to the virtual original image data shown in the first figure from above in FIG. 13, and the second figure from above in FIG. 14 shows virtual interpolated image data similar to the virtual interpolated image data shown in the third figure from above in FIG. 13, i.e., virtual interpolated image data generated by the virtualizer 26 which virtualizes the interpolated image data generated by the linear interpolator 22 which performs the linear interpolation on the virtual original image data in the first figure from above in FIG. 14.

The virtualizer 26 supplies the virtual interpolated image data shown in the second figure from above in FIG. 14 to the error calculator 29. The error calculator 29 is also supplied with the virtual interpolated image data shown in the first figure from above in FIG. 14 from the virtualizer 24.

The error calculator 29 calculates the difference between the virtual interpolated image data and the virtual original image data as shown in the third figure from above in FIG. 14. The error calculator 29 determines the sum of the absolute values of differences (the integral value of the absolute values of differences) between the virtual interpolated image data and the virtual original image data in the range (−0.5 to +0.5) of ±½ samples where the pixel value at the sampling point #0 of the interpolated image data is spread, as an error at the sampling point #0 of the interpolated image data with respect to the original image data. The error calculates 29 also determines the sum of the absolute values of differences between the virtual interpolated image data and the virtual original image data in the range (+0.5 to +1.5) of ±½ samples where the pixel value at the sampling point #1 of the interpolated image data is spread, as an error at the sampling point #1 of the interpolated image data with respect to the original image data. Similarly, the error calculator 29 determines errors at respective sampling points of the interpolated image data.

Each of the error calculators 28, 30 determines errors at respective sampling points of the interpolated image data, in the same manner as with the error calculator 29.

The errors at the sampling points of the interpolated image data with respect to the original image data may alternatively be the sum of the squares of the differences (the integral value of the squares of the differences), or the values of a function having an argument representing the differences, (e.g., weighting the absolute values of the differences based on the distances from the points of the original image data) rather than the sum of the absolute values of differences between the virtual interpolated image data and the virtual original image data in the range of ±½ samples where the pixel value at the sampling point of the interpolated image data is spread.

In the above embodiment, the virtualizer 24 generates the virtual original image data by carrying out the 0th-order interpolation process to spread the values of sampling points of the original image data by ±½ samples. However, the virtualizer 24 may generate the virtual original image data by performing the linear interpolation, the cubic interpolation, or any of various other interpolation processes on the original image data. The virtualizers 25 through 27 may similarly generate the virtual original image data.

The interpolation process that is carried out by the interpolation processor 16 shown in FIG. 9 in step S14 shown in FIG. 8 will be described in detail with reference to FIGS. 15 and 16.

Figure 15:
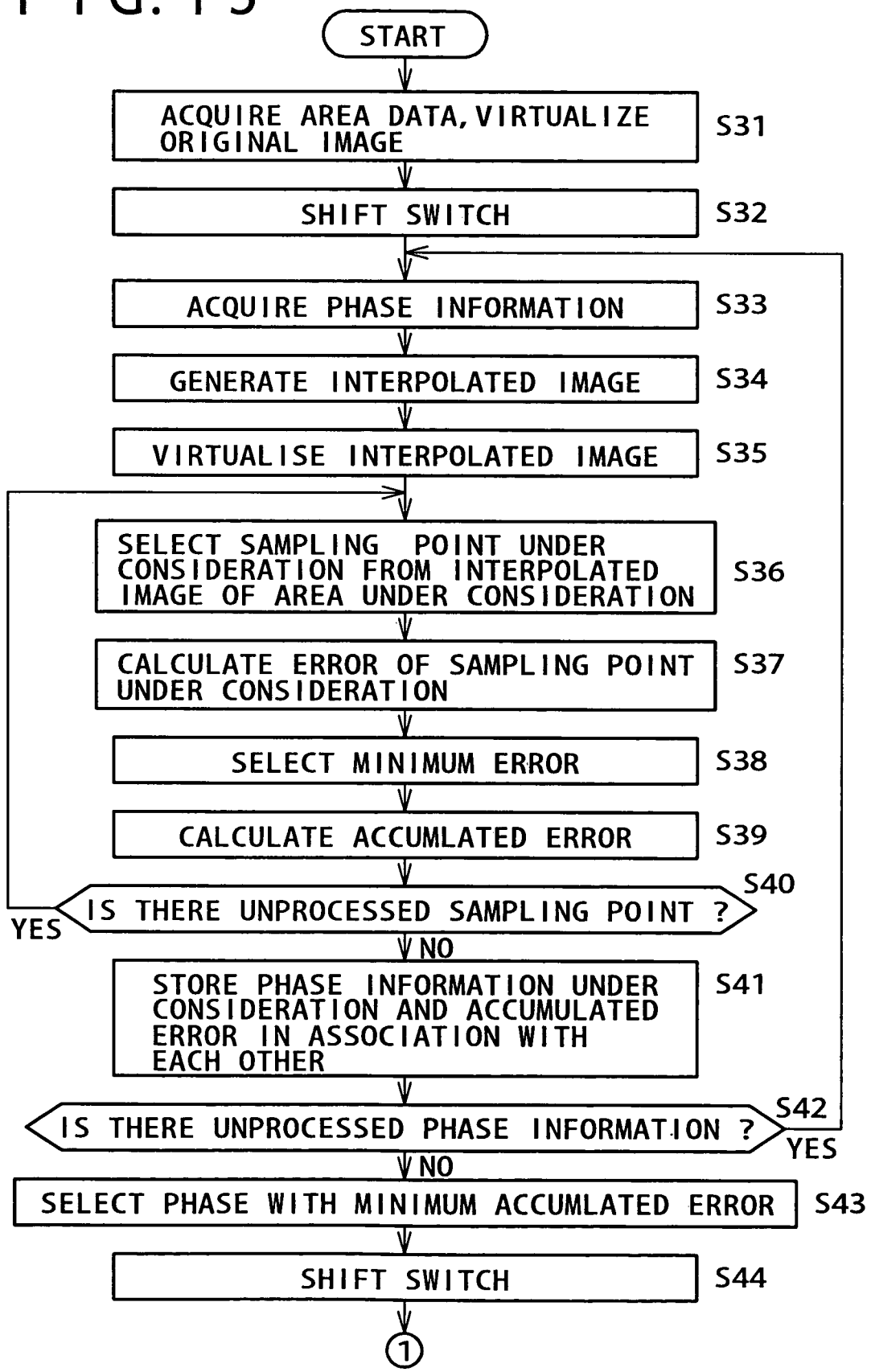
FIG. 15 is a flowchart of an interpolation process of the interpolation processor shown in FIG. 9.
Figure 16:
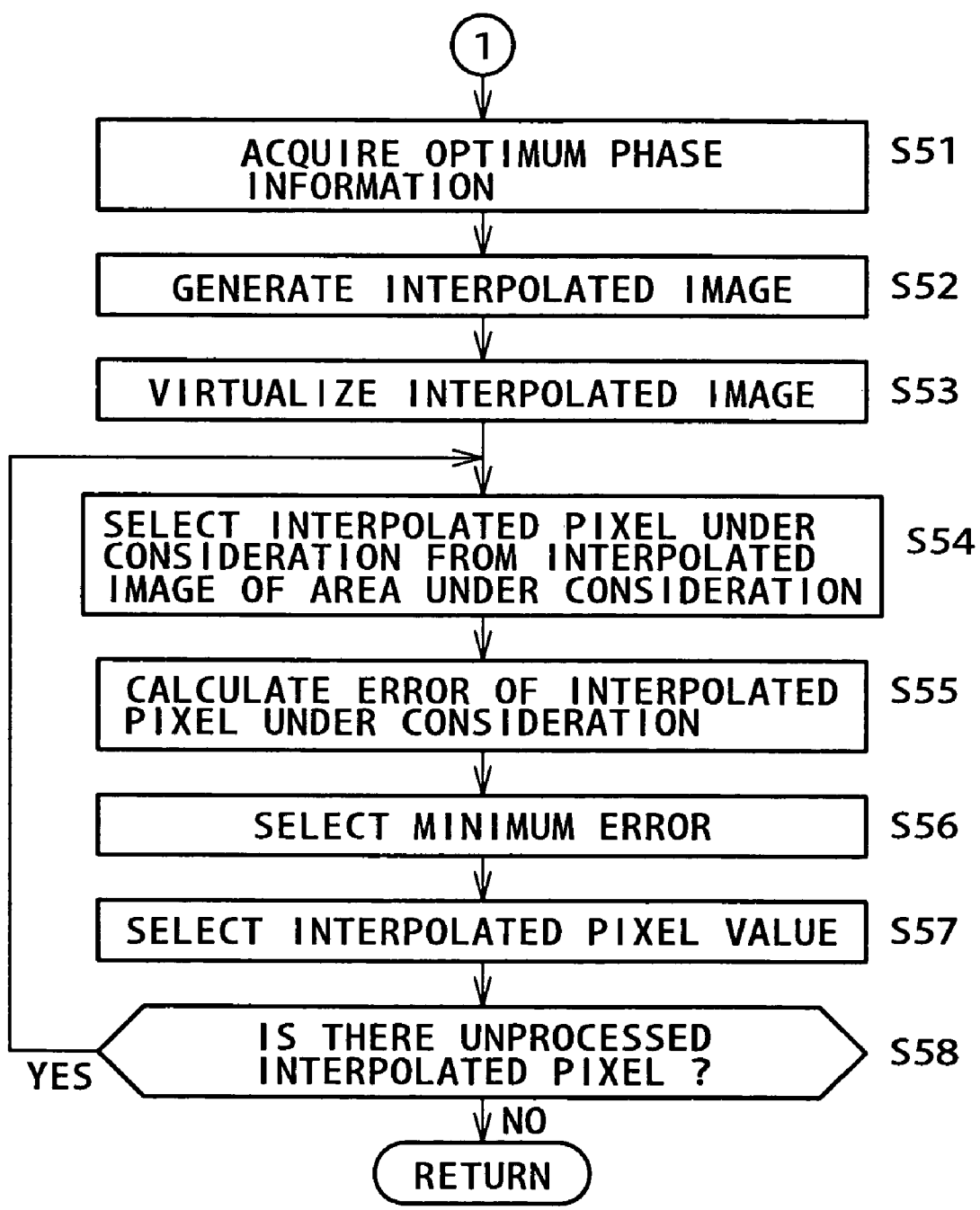
FIG. 16 is a flowchart of the interpolation process of the interpolation processor shown in FIG. 9.

In step S31 shown in FIG. 15, the virtualizer 24 acquires the area data of the area under consideration and the original image data. Then, also in step S31, the virtualizer 24 virtualizes the original image data in the area under consideration, and supplies the resultant virtual original image data to the error calculators 28 through 30. Then, control goes to step S32.

In step S32, the switch 35 is shifted to select the terminal 35*a*. The phase information output from the controller 15 shown in FIG. 4 is supplied through the switch 35 to the nearest interpolator 21, the linear interpolator 22, the cubic interpolator 23, and the others. Then, control goes to step S33.

In step S33, the nearest interpolator 21, the linear interpolator 22, the cubic interpolator 23, and the others acquire the phase information supplied from the controller 15 through the switch 35 as phase information under consideration. Then, control goes to step S34. In step S34, each of the nearest interpolator 21, the linear interpolator 22, the cubic interpolator 23 acquires the original image data in the area under consideration, and generates interpolated image data from the original image data, the interpolated image data having a sampling point #0 shifted from a sampling point #0 of the original image data by the phase represented by the phase information acquired in step S33. Specifically, the nearest interpolator 21 generates interpolated image data by performing the nearest interpolation on the original image data. The linear interpolator 22 generates interpolated image data by performing the linear interpolation on the original image data. The cubic interpolator 23 generates interpolated image data by performing the cubic interpolation on the original image data. The interpolated image data generated by the nearest interpolator 21, the interpolated image data generated by the linear interpolator 22, and the interpolated image data generated by the cubic interpolator 23 will hereinafter be referred to as nearest-interpolated data, linear-interpolated data, and cubic-interpolate data, respectively.

In step 34, the nearest interpolator 21, the linear interpolator 22, and the cubic interpolator 23 supply the nearest-interpolated data, the linear-interpolated data, and the cubic-interpolated data respectively to the virtualizers 25 through 27, and also to the interpolation process selector 32. Then, control goes to step S35.

In step S35, the virtualizers 25 through 27 virtualize the nearest-interpolated data, the linear-interpolated data, and the cubic-interpolate data, respectively, that are supplied respectively from the nearest interpolator 21, the linear interpolator 22, and the cubic interpolator 23 in step S34, thereby producing virtual interpolated image data. The virtual interpolated image data produced when the virtualizer 25 virtualizes the nearest-interpolated data, the virtual interpolated image data produced when the virtualizer 26 virtualizes the linear-interpolated data, and the virtual interpolated image data produced when the virtualizer 27 virtualizes the cubic-interpolated data will hereinafter be referred to as virtual nearest-interpolated data, virtual linear-interpolated data, and virtual cubic-interpolate data, respectively.

In step S35, the virtualizers 25 through 27 supply the virtual nearest-interpolated data, the virtual linear-interpolated data, and the virtual cubic-interpolate data respectively to the error calculators 28 through 30. Then, control goes to step S36.

In step S36, the error calculators 28 through 30 select one, not yet selected as a sampling point under consideration, of sampling points of the interpolated image data in the area under consideration, i.e., sampling points of the interpolated image data whose sampling point #0 is shifted in phase by the phase represented by the phase information under consideration, as a sampling point under consideration. Then, control goes to step S37.

In step S37, the error calculators 28 through 30 calculate respective errors of sampling points under consideration of the nearest-interpolated data, the linear-interpolated data, and the cubic-interpolate data, with respect to the original image data. Specifically, the error calculator 28 calculates an error of the sampling point under consideration of the nearest-interpolated data produced by the nearest interpolator 21, using the virtual original image data from the virtualizer 24 and the virtual nearest-interpolated data from the virtualizer 25, in the manner described above with reference to FIG. 14.

Similarly, the error calculator 29 calculates an error of the sampling point under consideration of the linear-interpolated data produced by the linear interpolator 22, using the virtual original image data from the virtualizer 24 and the virtual linear-interpolated data from the virtualizer 26, and the error calculator 30 calculates an error of the sampling point under consideration of the cubic-interpolated data produced by the cubic interpolator 23, using the virtual original image data from the virtualizer 24 and the virtual cubic-interpolated data from the virtualizer 27.

The error calculators 28 through 30 supply the errors of the sampling points under consideration of the nearest-interpolated data, the linear-interpolated data, and the cubic-interpolated data obtained with respect to the phase information under consideration, to the minimum error determining unit 31. Then, control goes from step S37 to step S38.

In step S38, the minimum error determining unit 31 selects (determines) a minimum error representing a smallest one of the errors of the sampling points under consideration of the nearest-interpolated data, the linear-interpolated data, and the cubic-interpolated data that are supplied respectively from the error calculators 28 through 30 in preceding step S37, and supplies the minimum error to the error value accumulator 33. Then, control goes to step S39.

In step S39, the error value accumulator 33, which has stored an accumulated error which is representative of accumulated minimum errors supplied so far from the minimum error determining unit 31, adds the minimum error supplied from the minimum error determining unit 31 in preceding step S38 to the stored accumulated error, and stores (overwrites) the sum as a new accumulated error. Then, control goes to step S40.

The accumulated error stored by the error value accumulator 33 is reset to 0 when new phase information is acquired as phase information under consideration in step S33, for example.

In step S40, the error calculators 28 through 30 determine whether there is any one, not yet selected as a sampling point under consideration, of the sampling points of the interpolated image data in the area under consideration, i.e., the sampling points of the interpolated image data whose sampling point #0 is shifted in phase by the phase represented by the phase information under consideration.

If it is determined in step S40 that there is one, not yet selected as a sampling point under consideration, of the sampling points of the interpolated image data in the area under consideration, then control goes back to step S36. In step S36, the error calculators 28 through 30 newly select one, not yet selected as a sampling point under consideration, of the sampling points of the interpolated image data in the area under consideration, as a sampling point under consideration. Thereafter, the processing in steps S37 through S40 is repeated.

If it is determined in step S40 that there is not one, not yet selected as a sampling point under consideration, of the sampling points of the interpolated image data in the area under consideration, i.e., if errors of the nearest-interpolated data, the linear-interpolated data, and the cubic-interpolated data are determined with respect to each of the sampling points of the interpolated image data in the area under consideration and the accumulated error representing an accumulated value of minimum errors of the errors of the sampling points is determined by the error value accumulator 33, then the error value accumulator 33 supplies the accumulated error to the minimum accumulated error determining unit 34. Then, control goes to step S41.

In step S41, the minimum accumulated error determining unit 34 stores the accumulated error supplied from the error value accumulator 33 in association with the phase information under consideration that is supplied through the switch 35. Then, control goes to step S42.

In step S42, the switch 35 determines whether all the phase information, e.g., the ten items of phase information as described above, has been supplied from the controller 15 or not. If it is determined in step S42 that not all the phase information has been supplied from the controller 15, then control returns to step S33 to wait for new phase information to be supplied from the controller 15. The processing from step S33 through step S42 is repeated with the supplied new phase information used as new phase information under consideration.

If it is determined in step S42 that all the phase information has been supplied from the controller 15, i.e., if the minimum accumulated error determining unit 34 has stored accumulated errors in association with all the phase information, then control goes to step S43. In step S43, the minimum accumulated error determining unit 34 selects (determines) a smallest one of the accumulated errors associated with all the phase information. In step S43, the minimum accumulated error determining unit 34 also outputs the phase information associated with the minimum accumulated error as optimum phase information representing an optimum phase for the interpolation of the original image data in the area under consideration to the terminal 35b of the switch 35. Then, control goes to step S44.

In step S44, the switch 35 is shifted to select the terminal 35b. The phase information output as the optimum phase information from the minimum accumulated error determining unit 34 is now supplied through the switch 35 to the nearest interpolator 21, the linear interpolator 22, the cubic interpolator 23, and the others. Then, control goes to step S51 shown in FIG. 16.

In step S51, the nearest interpolator 21, the linear interpolator 22, the cubic interpolator 23, and the others acquire the phase information supplied through the switch 35. Then, control goes to step S52. In step S52, the nearest interpolator 21, the linear interpolator 22, the cubic interpolator 23 acquire the original image data in the area under consideration, and generate nearest-interpolated image data, linear-interpolated data, and cubic-interpolated data, respectively, which each have a sampling point #0 shifted from a sampling point #0 of the original image data by the phase represented by the optimum phase information. In step S52, furthermore, the nearest interpolator 21, the linear interpolator 22, the cubic interpolator 23 supply the nearest-interpolated image data, the linear-interpolated data, and the cubic-interpolated data respectively to the virtualizers 25 through 27 and also to the interpolation process selector 32. The control goes to step S53.

In step S53, the virtualizers 25 through 27 virtualize the nearest-interpolated data, the linear-interpolated data, and the cubic-interpolate data, respectively, that are supplied respectively from the nearest interpolator 21, the linear interpolator 22, and the cubic interpolator 23 in step S52, thereby producing virtual nearest-interpolated data, virtual linear-interpolated data, and virtual cubic-interpolated data, respectively. In step S53, the virtualizers 25 through 27 also supply the virtual nearest-interpolated data, the virtual linear-interpolated data, and the virtual cubic-interpolated data respectively to the error calculators 28 through 30. Then, control goes to step S54.

In step S54, the error calculators 28 through 30 select one, not yet made a sampling point under consideration, of the sampling points of the interpolated image data in the area under consideration whose sampling point #0 is shifted in phase by the phase represented by the optimum phase information, as a sampling point under consideration. Then, control goes to step S55.

In step S55, as in step S37 shown in FIG. 15, the error calculators 28 through 30 calculate respective errors of sampling points under consideration of the nearest-interpolated data, the linear-interpolated data, and the cubic-interpolate data, with respect to the original image data. The error calculators 28 through 30 supply the calculated errors of sampling points under consideration of the nearest-interpolated data, the linear-interpolated data, and the cubic-interpolate data to the minimum error determining unit 31. Then, control goes to step S56.

In step S56, the minimum error determining unit 31 selects (determines) a minimum error representing a smallest one of the errors of the sampling points under consideration of the nearest-interpolated data, the linear-interpolated data, and the cubic-interpolated data that are supplied respectively from the error calculators 28 through 30 in preceding step S55, and controls the interpolation process selector 32 based on the minimum error. Then, control goes to step S57.

In step S57, the interpolation process selector 32 is controlled by the minimum error determining unit 31 to select either one of the nearest-interpolated data, the linear-interpolated data, and the cubic-interpolated data that are supplied respectively from the nearest interpolator 21, the linear interpolator 22, and the cubic interpolator 23, and supplies selected interpolated data as the pixel value at the sampling point under consideration to the main system memory 17 shown in FIG. 4. Specifically, the minimum error determining unit 31 controls the interpolation process selector 32 to select one of the nearest-interpolated data, the linear-interpolated data, and the cubic-interpolated data which gives a minimum error. Under the control of the minimum error determining unit 31, the interpolation process selector 32 selects one of the nearest-interpolated data, the linear-interpolated data, and the cubic-interpolated data which gives a minimum error as the pixel value at the sampling point under consideration, and supplies the selected interpolated data to the main system memory 17 shown in FIG. 4.

Thereafter, control goes from step S57 to step S58. In step S58, the error calculators 28 through 30 determine whether there is any one, not yet selected as a sampling point under consideration, of the sampling points of the interpolated image data in the area under consideration, i.e., the sampling points of the interpolated image data whose sampling point #0 is shifted in phase by the phase represented by the optimum phase information.

If it is determined in step S58 that there is one, not yet selected as a sampling point under consideration, of the sampling points of the interpolated image data in the area under consideration, then control goes back to step S54. In step S54, the error calculators 28 through 30 newly select one, not yet selected as a sampling point under consideration, of the sampling points of the interpolated image data in the area under consideration, as a sampling point under consideration. Thereafter, the processing in steps S55 through S58 is repeated.

If it is determined in step S58 that there is not one, not yet selected as a sampling point under consideration, of the sampling points of the interpolated image data in the area under consideration, i.e., if there is determined a pixel value for minimizing the error, with respect to the original image data, of each of the sampling points of the interpolated image data in the area under consideration with respect to the phase represented by the optimum phase information, then the interpolation process is put to an end, and control returns to the main routine.

As described above, virtual original image data including a virtual succession of the original image data and virtual interpolated image data including a virtual succession of the interpolated image data are generated, and errors of the interpolated image data with respect to the original image data are determined using the virtual original image data and the virtual interpolated image data. Therefore, errors of the interpolated image data which have a different number of sampling points from the original image data can easily be determined.

Furthermore, of the phase information representing the plural phases, the phase information representing the phase that minimizes the accumulated error representative of errors of the interpolated image data is used as optimum phase information, and interpolated image data of the phase represented by the optimum phase information is generated. Therefore, it is possible to generate interpolated image data having a small error with respect to the original image data. Specifically, if the original image data is free of frequency band limitations such as personal computer output data and text data for use on OSD, for example, then it is possible to obtain interpolated image data similar to the original image data, the interpolated image data maintaining sharp edges of the original image data.

Moreover, since the interpolation processor 16 performs its interpolation process on each character area, it is possible to determine interpolated image data that minimizes an accumulated error for each character area.

Furthermore, of the interpolated image data obtained respectively by the nearest interpolation process, the linear interpolation process, and the cubic interpolation process, the interpolated image data whose error with respect to the original image data is small is selected as the pixel values of sampling points under consideration of the interpolated image data. Consequently, without the need for determining which attributes, such as natural image, text, or business graph, sampling points (pixels) under consideration have, an interpolation process suitable for those sampling points can be employed to produce interpolated image data whose error with respect to the original image data is small.

Figure 17:
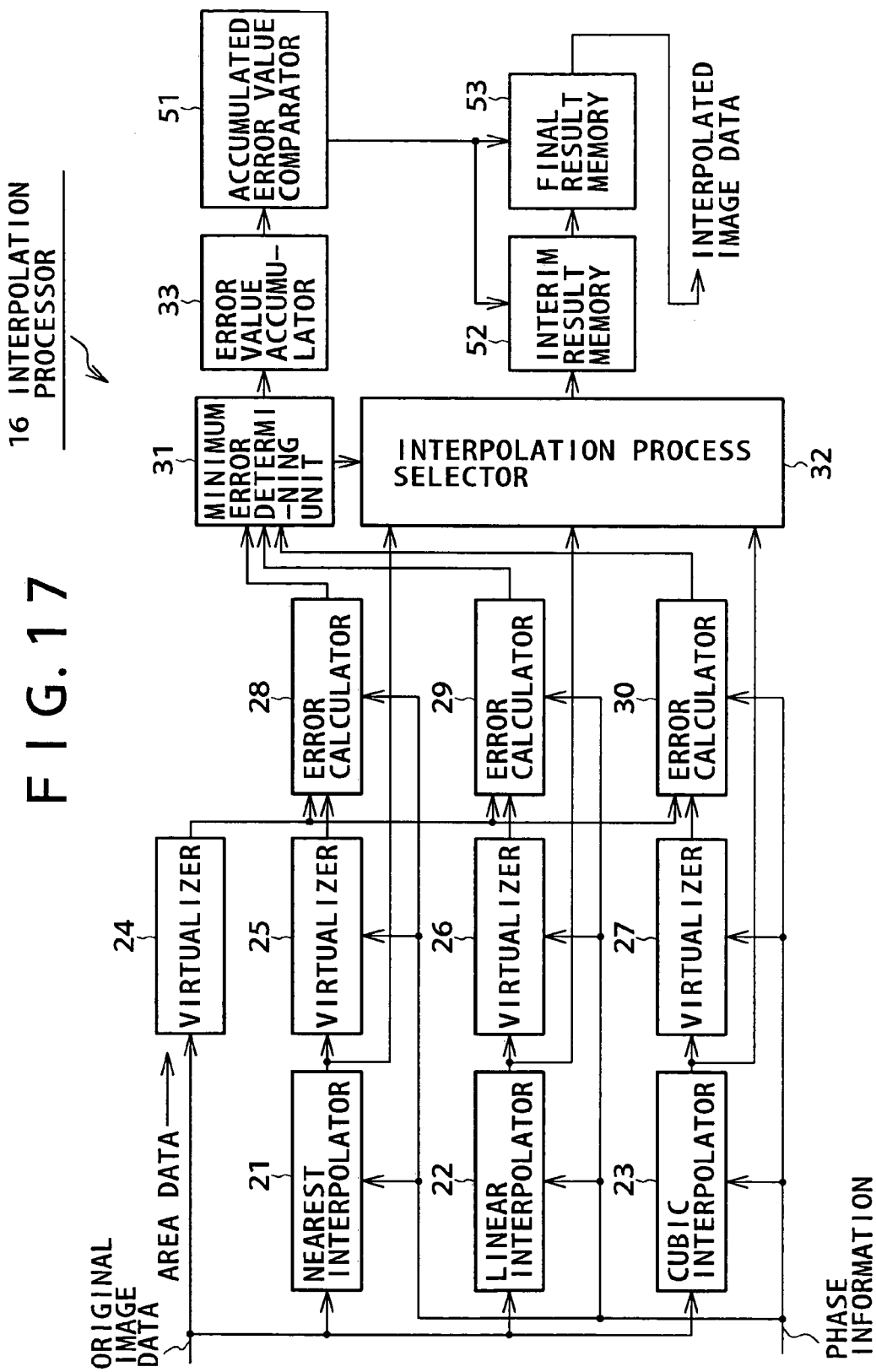
FIG. 17 is a block diagram of another interpolation processor of the image processing apparatus.

FIG. 17 shows in block form another interpolation processor 16 of the image processing apparatus. Those parts of the interpolation processor 16 shown in FIG. 17 which are identical to those of the interpolation processor 16 shown in FIG. 9 are denoted by identical reference characters, and will not be described in detail below. The interpolation processor 16 shown in FIG. 17 is devoid of the minimum accumulated error determining unit 34 and the switch 35, and additionally has an accumulated error value comparator 51, an interim result memory 52, and a final result memory 53. Other details of the interpolation processor 16 shown in FIG. 17 are identical to those of the interpolation processor 16 shown in FIG. 9.

The accumulated error value comparator 51 compares the accumulated error with respect to the phase information under consideration, which is supplied from the error value accumulator 33, with a minimum accumulated error that already stored in the accumulated error value comparator 51. If the accumulated error supplied from the error value accumulator 33 is smaller than the minimum accumulated error (or equal to or smaller than the minimum accumulated error), then the accumulated error value comparator 51 updates the minimum accumulated error into the accumulated error supplied from the error value accumulator 33, and newly stores (overwrites) the updated minimum accumulated error. When the accumulated error value comparator 51 updates the minimum accumulated error, the accumulated error value comparator 51 supplies enable signals respectively to the interim result memory 52 and the final result memory 53, enabling them to read and write interpolated image data, respectively.

The interim result memory 52 stores interpolated pixel values of sampling points under consideration output from the interpolation process selector 32 in overwriting relation to the previously stored interpolated image data. When the interim result memory 52 is supplied with an enable signal from the accumulated error value comparator 51, the interim result memory 52 reads the interpolated image data made up of the pixel values stored therein in the area under consideration, and supplies the read interpolated image data to the final result memory 53.

When the final result memory 53 is supplied with an enable signal from the accumulated error value comparator 51, the final result memory 53 stores the interpolated image data in the area under consideration supplied from the interim result memory 52 in overwriting relation to the previously stored interpolated image data.

The interpolation processor 16 shown in FIG. 17 operates in the same manner as the interpolation processor 16 shown in FIG. 9 in that it uses the phase information that minimizes the accumulated error, of the ten items of the phase information, as optimum phase information, and determines interpolated image data made up of pixel values that minimize the errors of respective sampling points of the interpolated image data.

The interpolation processor 16 shown in FIG. 9 determines an accumulated error with respect to each of the ten items of the phase information, determines optimum phase information based on the accumulated error, and determines interpolated image data made up of a pixel value that minimize the error of each sampling point. However, the interpolation processor 16 shown in FIG. 17 differs from the interpolation processor 16 shown in FIG. 9 as follows.

When the interpolation processor 16 shown in FIG. 17 determines an accumulated error with respect to each of the ten items of the phase information, it holds the interpolated image data of the phase represented by the phase information which gives a minimum value of the accumulated errors that have been obtained so far, in the final result memory 53. With the interpolation processor 16 shown in FIG. 17, therefore, at the time when all accumulated errors with respect to the respective ten items of the phase information have been determined, the interpolated image data of the phase represented by the optimum phase information is stored in the final result memory 53.

Figure 18:
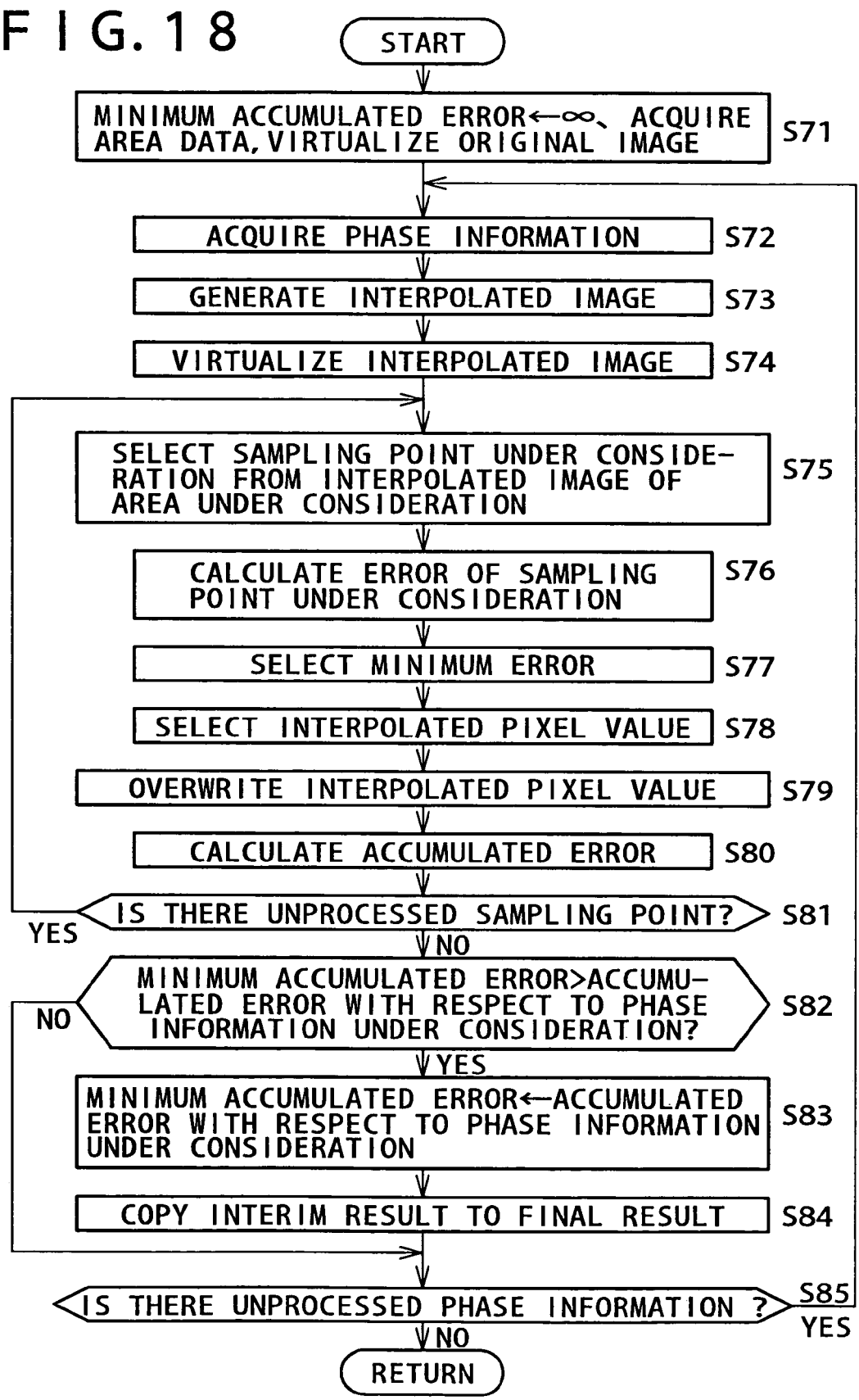
FIG. 18 is a flowchart of an interpolation process of the interpolation processor shown in FIG. 17.

An interpolation process that is carried out by the interpolation processor 16 shown in FIG. 17 in step S14 shown in FIG. 8 will be described in detail with reference to FIG. 18.

In step S71, the virtualizer 24 acquires the area data of the area under consideration and the original image data. Then, also in step S71, the virtualizer 24 virtualizes the original image data in the area under consideration, and supplies the resultant virtual original image data to the error calculators 28 through 30. In step S71, the accumulated error value comparator 51 initializes a minimum accumulated error (a variable that stores a minimum accumulated error) to a predetermined large value. Then, control goes to step S72.

In step S72, the nearest interpolator 21, the linear interpolator 22, the cubic interpolator 23, and the others acquire the phase information supplied from the controller 15 shown in FIG. 4 as phase information under consideration. Then, control goes to step S73.

In step S73, each of the nearest interpolator 21, the linear interpolator 22, the cubic interpolator 23 acquires the original image data in the area under consideration in the same manner as in step S34 shown in FIG. 15. The nearest interpolator 21, the linear interpolator 22, the cubic interpolator 23 generate nearest-interpolated data, linear-interpolated data, and cubic-interpolated data, respectively, from the original image data, each having a sampling point #0 shifted from a sampling point #0 of the original image data by the phase represented by the phase information acquired in step S72.

In step S73, the nearest interpolator 21, the linear interpolator 22, the cubic interpolator 23 also supply the nearest-interpolated data, the linear-interpolated data, and the cubic-interpolated data respectively to the virtualizers 25 through 27, and also to the interpolation process selector 32. Then, control goes to step S74.

In step S74, the virtualizers 25 through 27 virtualize the nearest-interpolated data, the linear-interpolated data, and the cubic-interpolate data, respectively, that are supplied respectively from the nearest interpolator 21, the linear interpolator 22, and the cubic interpolator 23 in step S73, thereby producing virtual nearest-interpolated data, virtual linear-interpolated data, and virtual cubic-interpolated data as virtual interpolated image data. In step S74, the virtualizers 25 through 27 also supply the virtual nearest-interpolated data, the virtual linear-interpolated data, and the virtual cubic-interpolate data respectively to the error calculators 28 through 30. Then, control goes to step S75.

In step S75, the error calculators 28 through 30 select one, not yet selected as a sampling point under consideration, of sampling points of the interpolated image data in the area under consideration, i.e., sampling points of the interpolated image data whose sampling point #0 is shifted in phase by the phase represented by the phase information under consideration, as a sampling point under consideration. Then, control goes to step S76.

In step S76, the error calculators 28 through 30 calculate respective errors of sampling points under consideration of the nearest-interpolated data, the linear-interpolated data, and the cubic-interpolate data, with respect to the original image data, using the virtual nearest-interpolated data, the virtual linear-interpolated data, the virtual cubic-interpolated data, and the virtual original image data, and supply the errors of the sampling points under consideration of the nearest-interpolated data, the linear-interpolated data, and the cubic-interpolated data obtained with respect to the phase information under consideration, to the minimum error determining unit 31, in the same manner as with step 37 shown in FIG. 15. Then, control goes to step S77.

In step S77, the minimum error determining unit 31 selects (determines) a minimum error representing a smallest one of the errors of the sampling points under consideration of the nearest-interpolated data, the linear-interpolated data, and the cubic-interpolated data that are supplied respectively from the error calculators 28 through 30 in preceding step S76, controls the interpolation process selector 32 based on the minimum error, and supplies the minimum error to the error value accumulator 33. Then, control goes to step S78.

In step S78, the interpolation process selector 32 is controlled by the minimum error determining unit 31 to select either one of the nearest-interpolated data, the linear-interpolated data, and the cubic-interpolated data of the sampling points under consideration that are supplied respectively from the nearest interpolator 21, the linear interpolator 22, and the cubic interpolator 23, and supply the selected interpolated data as the pixel value of the sampling point under consideration to the interim result memory 52. Specifically, the minimum error determining unit 31 controls the interpolation process selector 32 to select one of the nearest-interpolated data, the linear-interpolated data, and the cubic-interpolated data of the sampling points under consideration which gives a minimum error. Under the control of the minimum error determining unit 31, the interpolation process selector 32 selects one of the nearest-interpolated data, the linear-interpolated data, and the cubic-interpolated data which gives a minimum error as the pixel value at the sampling point under consideration, and supplies the selected interpolated data to the interim result memory 52.

Thereafter, control goes from step S78 to step S79. In step S79, the interim result memory 52 stores the pixel value selected by the interpolation process selector 32 with respect to the sampling point under consideration of the interpolated image data of the phase represented by the phase information under consideration, in overwriting relation to the address corresponding to the sampling point under consideration. Then, control goes to step S80.

In step 80, the error value accumulator 33 adds the minimum error supplied from the minimum error determining unit 31 in preceding step S77 to the stored accumulated error, and stores (overwrites) the sum as a new accumulated error. Then, control goes to step S81.

The accumulated error stored by the error value accumulator 33 is reset to 0 when new phase information is acquired as phase information under consideration in step S72, for example.

In step S81, the error calculators 28 through 30 determine whether there is any one, not yet selected as a sampling point under consideration, of the sampling points of the interpolated image data in the area under consideration, i.e., the sampling points of the interpolated image data whose sampling point #0 is shifted in phase by the phase represented by the phase information under consideration.

If it is determined in step S81 that there is one, not yet selected as a sampling point under consideration, of the sampling points of the interpolated image data in the area under consideration, then control goes back to step S75. In step S75, the error calculators 28 through 30 newly select one, not yet selected as a sampling point under consideration, of the sampling points of the interpolated image data in the area under consideration, as a sampling point under consideration. Thereafter, the processing in steps S76 through S81 is repeated.

If it is determined in step S81 that there is not one, not yet selected as a sampling point under consideration, of the sampling points of the interpolated image data in the area under consideration, i.e., if errors of the nearest-interpolated data, the linear-interpolated data, and the cubic-interpolated data are determined with respect to each of the sampling points of the interpolated image data in the area under consideration and the accumulated error representing an accumulated value of minimum errors of the errors of the sampling points is determined by the error value accumulator 33, and interpolated image data including pixel values which give the accumulated error is stored in the interim result memory 52, then the error value accumulator 33 supplies the accumulated error determined with respect to the phase information under consideration to the accumulated error value comparator 51. Then, control goes to step S82.

In step S82, the accumulated error value comparator 51 compares the accumulated error with respect to the phase information under consideration from the error value accumulator 33 with the stored minimum accumulated error to determine whether the accumulated error with respect to the phase information under consideration is smaller than the minimum accumulated error or not.

If it is determined in step S82 that the accumulated error with respect to the phase information under consideration is not smaller than the minimum accumulated error stored by the accumulated error value comparator 51, then control skips steps S83, S84 and goes to step S85.

If it is determined in step S82 that the accumulated error with respect to the phase information under consideration is smaller than the minimum accumulated error stored by the accumulated error value comparator 51, then control goes to step S83. In step S83, the accumulated error value comparator 51 updates the stored minimum accumulated error into the accumulated error with respect to the phase information under consideration, and stores the updated minimum accumulated error in overwriting relation to the previously stored minimum accumulated error. Then, control goes to step S84.

In step S84, the accumulated error value comparator 51 supplies enable signals respectively to the interim result memory 52 and the final result memory 53, supplying the interpolated image data including pixel values which give the accumulated error at the present time from the interim result memory 52 to the final result memory 53, which copies (overwrites) the supplied interpolated image data.

Then, control goes from step S84 to step S85. In step S85, the error calculators 28 through 30 determine whether all the phase information, e.g., the ten items of phase information as described above, has been supplied from the controller 15 or not. If it is determined in step S85 that not all the phase information has been supplied from the controller 15, then control returns to step S72 to wait for new phase information to be supplied from the controller 15. The processing from step S73 through step S85 is repeated with the supplied new phase information used as new phase information under consideration.

If it is determined in step S85 that all the phase information has been supplied from the controller 15, i.e., if the accumulated error value comparator 51 has compared the accumulated errors with respect to all the phase information and determined a minimum one of the accumulated errors, and the interpolated image data including pixel values which give the minimum accumulated error is stored in the final result memory 53, then the interpolation process is put to an end, and control returns to the main routine.

The interpolation processor 16 shown in FIG. 17 is capable of obtaining interpolated image data having smaller error more quickly than the interpolation processor 16 shown in FIG. 9.

The processing sequences described above may be hardware-implemented or software-implemented. If the processing sequences are software-implemented, then a software program for the processing sequences is installed in a general-purpose computer or the like.

FIG. 19 shows in block form a computer in which such a software program for the processing sequences is installed.

As shown in FIG. 19, the program can be recorded in a hard disk 105 or a ROM (Read Only Memory) 103 which is a recording medium incorporated in the computer.

Alternatively, the program can be temporarily or permanently stored (recorded) in a removable recording medium 111 such as a flexible disk, a CD-ROM (Compact Disc Read Only Memory), a MO (Magneto-Optical) disk, a DVD (Digital Versatile Disc), a magnetic disk, or a semiconductor memory. The removable recording medium 111 may be provided as so-called package software.

The program may be installed from the removable recording medium 111 into the computer, or transferred from a downloading site through an artificial satellite for digital satellite broadcasting to the computer through a radio link, or through a network such as a LAN (Local Area Network) or the Internet in a wired link. The computer may receive the program thus transferred with a communication unit 108 and install the program into the hard disk 105.

The computer has a CPU (Central Processing Unit) 102. An input/output interface 110 is connected to the CPU 102 through a bus 101. When the CPU 102 is supplied with a command through the input/output interface 110 from an input unit 107 such as a keyboard, a mouse, a microphone, etc. that is operated by the user, the CPU 102 executes the program stored in the ROM 103. Alternatively, the CPU 101 loads the program stored in the hard disk 105, the program transferred from a satellite or a network, received by the communication unit 108, and installed in the hard disk 105, or the program read from the removable recording medium 111 mounted on the drive 109 and installed in the hard disk 105, into a RAM (Random Access Memory) 104, and executes the installed program. The CPU 102 now performs the processing sequences shown in the above flowcharts or processing sequences according to the arrangements shown in block form as described above. The CPU 102 then outputs processed results through input/output interface 110 from an output unit 106 such as an LCD (Liquid Crystal Display), speakers, etc., or transmits processed results from the communication unit 108, and records processed results in the hard disk 105.

Processing steps that are descriptive of the program which enables the computer to perform the various processing sequences may not necessarily be processed in the order described in the above flowcharts, but may be processed parallel or individually, e.g., according to parallel processing or object processing operation.

The program may be processed by a single computer or may be processed in a distributed fashion by a plurality of computers. The program may be transferred to a remote computer and executed thereby.

In the above embodiments, image data are interpolated. The present invention is also applicable to the interpolation of audio data and the interpolation of moving images and still images.

In the illustrated embodiments, interpolated image data are generated with respect to a plurality of phases of sampling points of interpolated image data, an optimum phase which minimizes an accumulated error is determined, and interpolated image data including pixel values generated by one of a plurality of interpolation processes which minimizes an error at each sampling point of the optimum phase. However, either a certain single interpolation process or a certain single phase may be employed.

Specifically, the interpolation processor 16 can determine interpolated image data having an optimum phase which minimizes an accumulated error, of a plurality of phases of sampling points of interpolated image data, according to a single interpolation. Furthermore, the interpolation processor 16 can determine interpolated image data including pixel values that are generated by one of interpolation processes which minimizes errors at sampling points with respect to a certain fixed phase.

In the illustrated embodiments, the three interpolation processes, i.e., the nearest interpolation, the linear interpolation, and the cubic interpolation, are employed. However, a plurality of interpolation processes such as two of the above three interpolation processes, at least four interpolation processes including the above three interpolation processes and one and more other interpolation processes, or any desired other interpolation processes can be employed.

In the illustrated embodiments, original image data are interpolated spatially. However, original image data may be interpolated temporally.

In the illustrated embodiments, the interpolation processor 16 interpolates original image data in each character area thereof. However, the interpolation processor 16 may interpolate original image data in each frame (or field) thereof or in each desired unit thereof.

The present invention is applicable to either a reduction or an increase in the number of sampling points from original image data.

The present invention is applicable to color images or monochromatic images (gray-scale images).

The interpolation processor 16 may interpolate computer graphic or other image areas, for example, in addition to character areas.

Although certain preferred embodiments of the present invention have been shown and described in detail, it should be understood that various changes and modifications may be made therein without departing from the scope of the appended claims.

What is claimed is:

1. A data processing apparatus for converting discrete original image data into interpolated image data having a different number of sampling data from the original image data, comprising:
   generating means for generating a plurality of said interpolated image data from said original image data;
   first virtualizing means for generating first virtual data comprising a virtual succession of said original image data;
   second virtualizing means for generating virtual data comprising a virtual succession of each of the plural interpolated image data;
   error calculating means for calculating an error between each of said second virtual data with respect to the plural interpolated image data and said first virtual data;
   selecting means for selecting either one of the plural interpolated image data based on said error; and
   outputting means for outputting the selected interpolated image data.

2. A data processing apparatus according to claim 1, wherein said generating means generates said interpolated image data with respect to each of a plurality of phases of sampling points of said interpolated image data, and said selecting means selects one of the interpolated image data generated with respect to the phases which minimizes said error.

3. A data processing apparatus according to claim 1, wherein said generating means generates said interpolated image data according to each of a plurality of interpolation processes, and said selecting means selects one of said interpolated image data generated according to each of said interpolation processes which minimizes said error.

4. A data processing apparatus according to claim 1, wherein said generating means generates said interpolated image data with respect to each of a plurality of phases of sampling points of said interpolated image data according to each of a plurality of interpolation processes, and said selecting means selects one of said interpolated image data generated according to each of said interpolation processes which minimizes said error, with respect to one of the phases which minimizes an accumulated value of said error.

5. A data processing apparatus according to claim 1, wherein said first or second virtualizing means generates said first or second virtual data by performing 0th-order interpolation on said original image data or interpolated image data.

6. A data processing apparatus according to claim 1, further comprising:
    area detecting means for detecting a character area comprising a character in part or entirety from original image data;
    wherein said generating means generates the plural interpolated image data from image data of said character area as said original image data.

7. A data processing apparatus according to claim 6, further comprising:
    combining means for combining said original image data and said interpolated image data selected by said selecting means with each other.

8. A data processing method of converting discrete original image data into interpolated image data having a different number of sampling data from the original image data, comprising the steps of:
    generating a plurality of said interpolated image data from said original image data;
    generating first virtual data comprising a virtual succession of said original image data;
    generating second virtual data comprising a virtual succession of each of the plural interpolated image data;
    calculating an error between each of said second virtual data with respect to the plural interpolated image data and said first virtual data;
    selecting either one of the plural interpolated image data based on said error; and
    outputting the selected interpolated image data.

9. A computer-readable medium for storing a program for enabling a computer to perform a data processing process for converting discrete original image data into interpolated image data having a different number of sampling data from said original image data, comprising the steps of:
    generating a plurality of said interpolated image data from said original image data;
    generating first virtual data comprising a virtual succession of said original image data;
    generating second virtual data comprising a virtual succession of each of the plural interpolated image data;
    calculating an error between each of said second virtual data with respect to the plural interpolated image data and said first virtual data; and
    selecting either one of the plural interpolated image data based on said error; and
    outputting the selected interpolated image data.

* * * * *